US012560854B2

(12) United States Patent
Liu et al.

(10) Patent No.: US 12,560,854 B2
(45) Date of Patent: Feb. 24, 2026

(54) DRIVING STRUCTURE FOR OPTICAL ACTUATOR AND CORRESPONDING CAMERA MODULE

(71) Applicant: NINGBO SUNNY OPOTECH CO., LTD., Zhejiang (CN)

(72) Inventors: Jia Liu, Zhejiang (CN); Qianglong Bian, Zhejiang (CN); Jianhong Li, Zhejiang (CN); Hu Wu, Zhejiang (CN); Hangang Wei, Zhejiang (CN)

(73) Assignee: NINGBO SUNNY OPOTECH CO., LTD., Zhejiang (CN)

( * ) Notice: Subject to any disclaimer, the term of this patent is extended or adjusted under 35 U.S.C. 154(b) by 274 days.

(21) Appl. No.: 18/037,838

(22) PCT Filed: Nov. 8, 2021

(86) PCT No.: PCT/CN2021/129251
§ 371 (c)(1),
(2) Date: May 19, 2023

(87) PCT Pub. No.: WO2022/111263
PCT Pub. Date: Jun. 2, 2022

(65) Prior Publication Data
US 2024/0004265 A1      Jan. 4, 2024

(30) Foreign Application Priority Data

Nov. 25, 2020   (CN) .......................... 202011338735.7
Nov. 25, 2020   (CN) .......................... 202011338741.2

(51) Int. Cl.
*G03B 5/02*          (2021.01)
*G02B 27/64*         (2006.01)
(Continued)

(52) U.S. Cl.
CPC ............. *G03B 5/02* (2013.01); *G02B 27/646* (2013.01); *H01F 7/081* (2013.01); *H01F 7/126* (2013.01);
(Continued)

(58) Field of Classification Search
CPC ............. G03B 5/02; G03B 2205/0007; G03B 2205/0069; G03B 5/00; H04N 23/681;
(Continued)

(56) References Cited

U.S. PATENT DOCUMENTS

2017/0134628 A1* 5/2017 Hwang .................... G03B 3/10
2020/0089020 A1* 3/2020 Lee ........................ G03B 11/04
(Continued)

FOREIGN PATENT DOCUMENTS

CN          105573014          5/2016
CN          108540725          9/2018
(Continued)

OTHER PUBLICATIONS

International Search Report issued Jan. 26, 2022 in International (PCT) Application No. PCT/CN2021/129251.
(Continued)

*Primary Examiner* — Bao Q Truong
(74) *Attorney, Agent, or Firm* — Wenderoth, Lind & Ponack, L.L.P.

(57)          ABSTRACT

The present application relates to a driving structure for an optical actuator including: a first driving part adapted to mounting a camera lens; and a second driving part adapted to mounting a photosensitive assembly, wherein the first driving part and the second driving part have a common magnet, the common magnet is arranged on a first base part or a second base part, the photosensitive assembly includes a photosensitive chip, and the first driving part drives the camera lens to translate in x-axis and y-axis directions by
(Continued)

means of the electromagnetic induction of a camera lens driving coil and the common magnet, and the second driving part drives the photosensitive chip to translate in the x-axis and y-axis directions by means of the electromagnetic induction of a photosensitive assembly driving coil and the common magnet; and the camera lens and the photosensitive chip are configured to be driven simultaneously and move in opposite directions. Further provided in the present application is a corresponding camera module. According to the present application, the anti-shake stroke and the anti-shake response speed of the camera module may be improved while keeping the volume of the module relatively small.

20 Claims, 18 Drawing Sheets

(51) Int. Cl.
  *H01F 7/08* (2006.01)
  *H01F 7/126* (2006.01)
  *H04N 23/68* (2023.01)

(52) U.S. Cl.
  CPC ......... *H04N 23/681* (2023.01); *H04N 23/687* (2023.01); *G03B 2205/0007* (2013.01); *G03B 2205/0069* (2013.01)

(58) Field of Classification Search
  CPC .... H04N 23/687; H04N 23/68; H04N 23/685; G02B 27/646; G02B 27/64; H01F 7/081; H01F 7/126; H01F 7/08
  See application file for complete search history.

(56) References Cited

U.S. PATENT DOCUMENTS

2020/0314338 A1    10/2020   Johnson et al.
2021/0018819 A1*   1/2021   Min ......................... G02B 7/06

FOREIGN PATENT DOCUMENTS

| CN | 108989629 | 12/2018 |
|---|---|---|
| CN | 208940074 | 6/2019 |
| CN | 209299370 | 8/2019 |
| CN | 209402560 | 9/2019 |
| CN | 111698352 | 9/2020 |
| JP | 6086109 | 2/2017 |
| WO | 2010/044195 | 4/2010 |

OTHER PUBLICATIONS

Extended European Search Report issued Apr. 2, 2024 in European Patent Application 21896764.4.

* cited by examiner

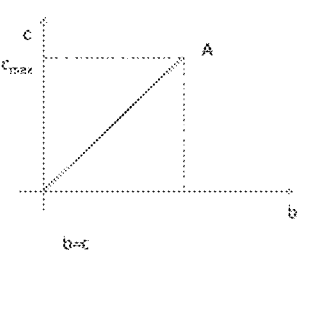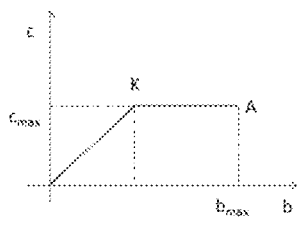
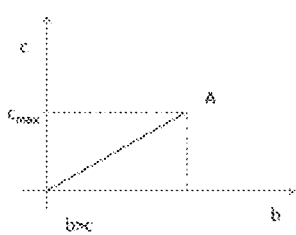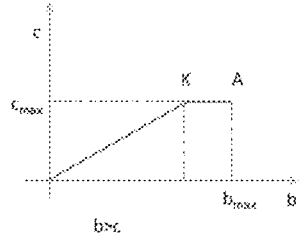
Fig. 4
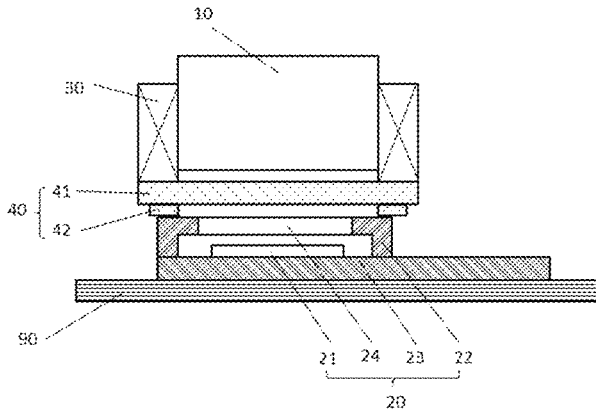
Fig. 5
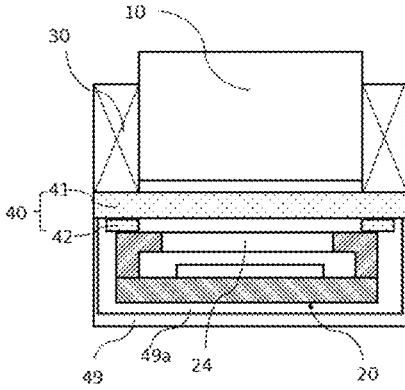
Fig. 6

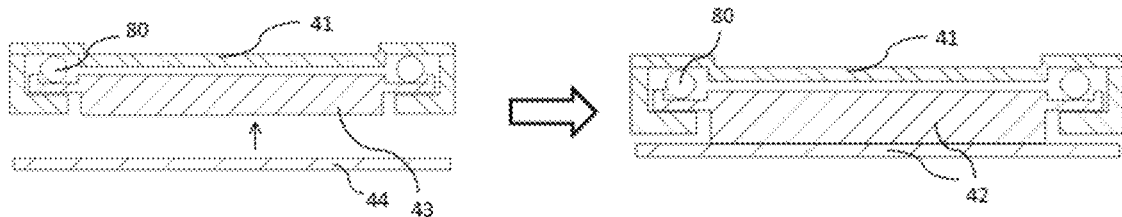
Fig. 11b
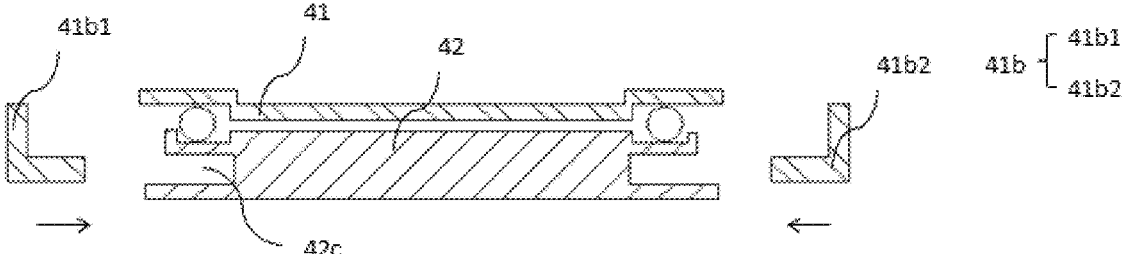
Fig. 11c
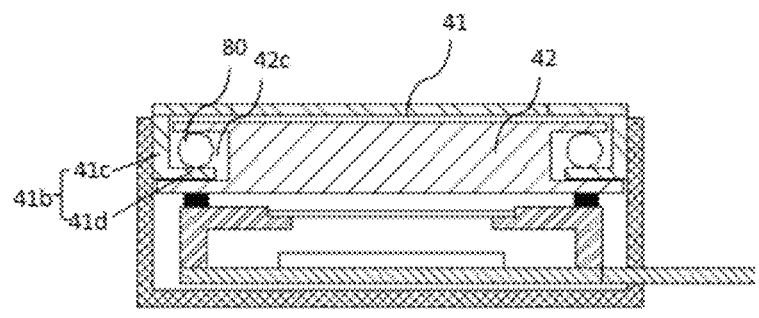
Fig. 12
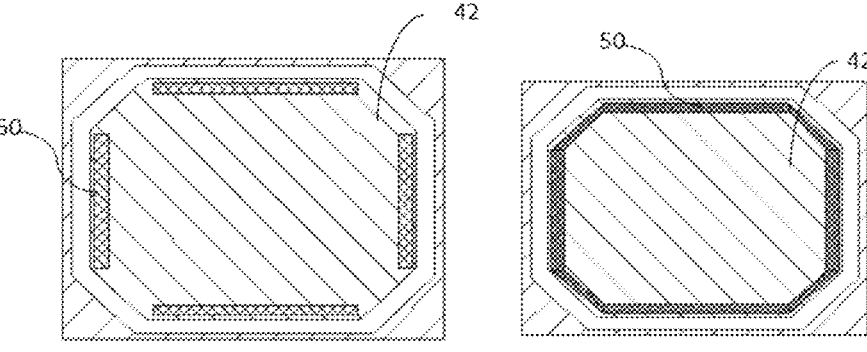
Fig. 13a                   Fig. 13b

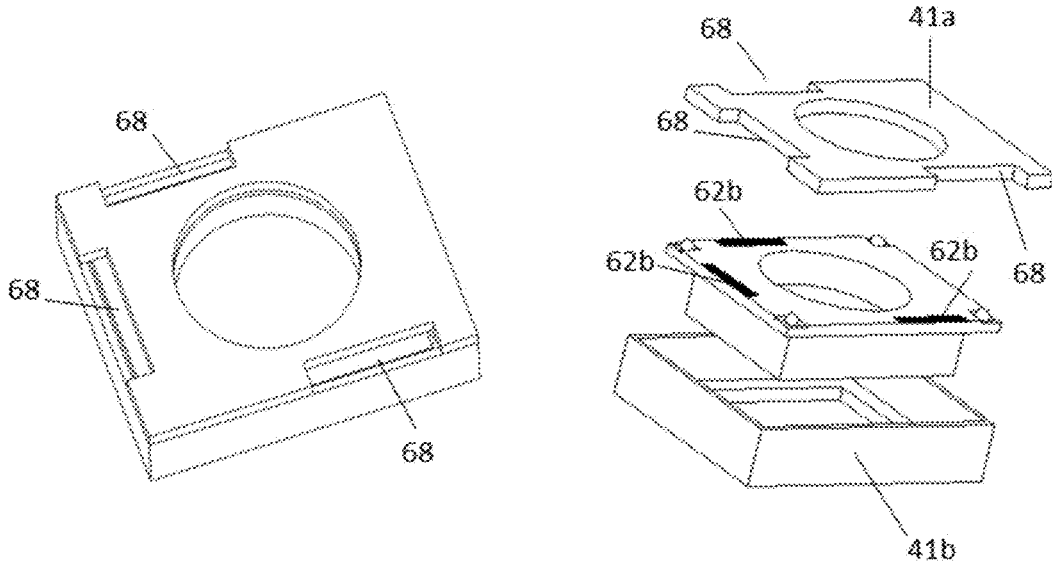
Fig. 15e                    Fig. 15f
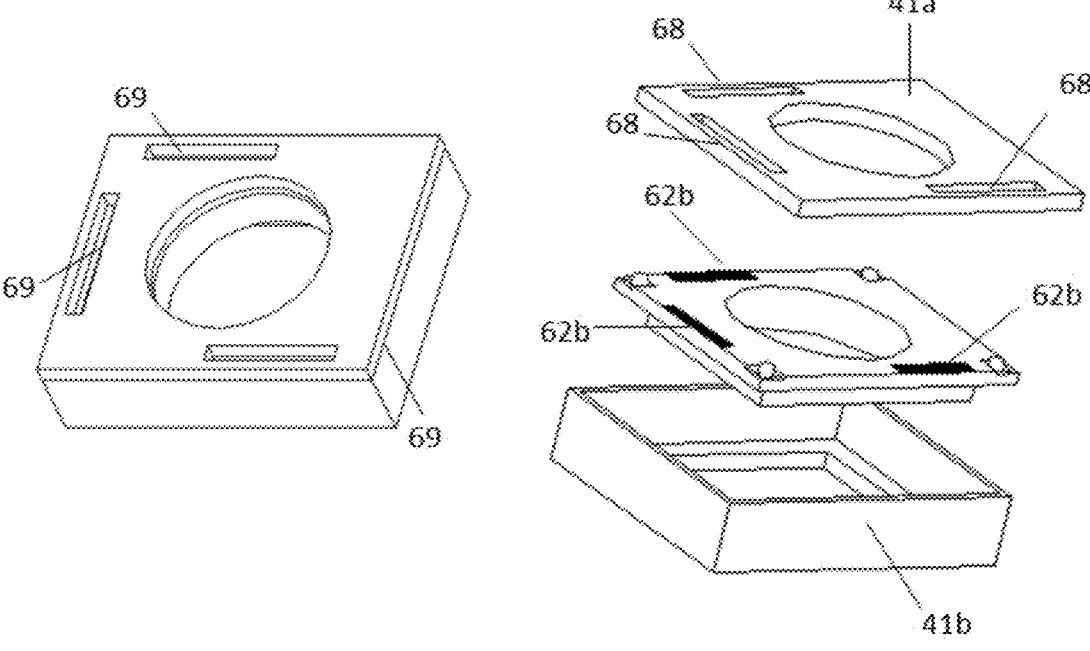
Fig. 15g                    Fig. 15h

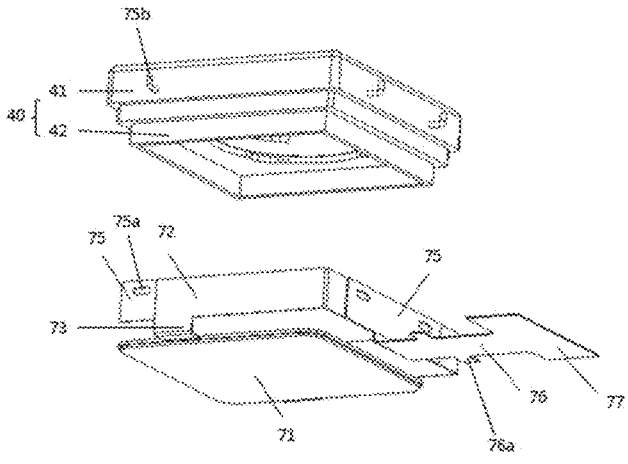
Fig. 19
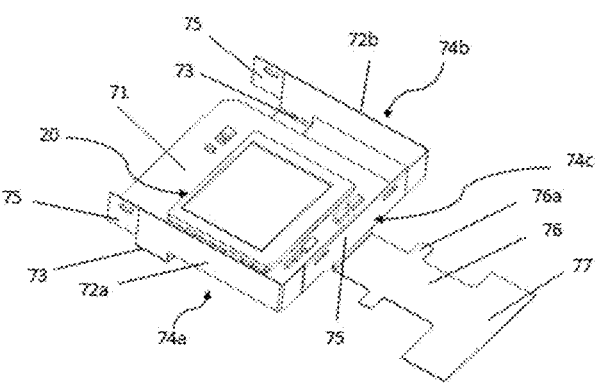
Fig. 20
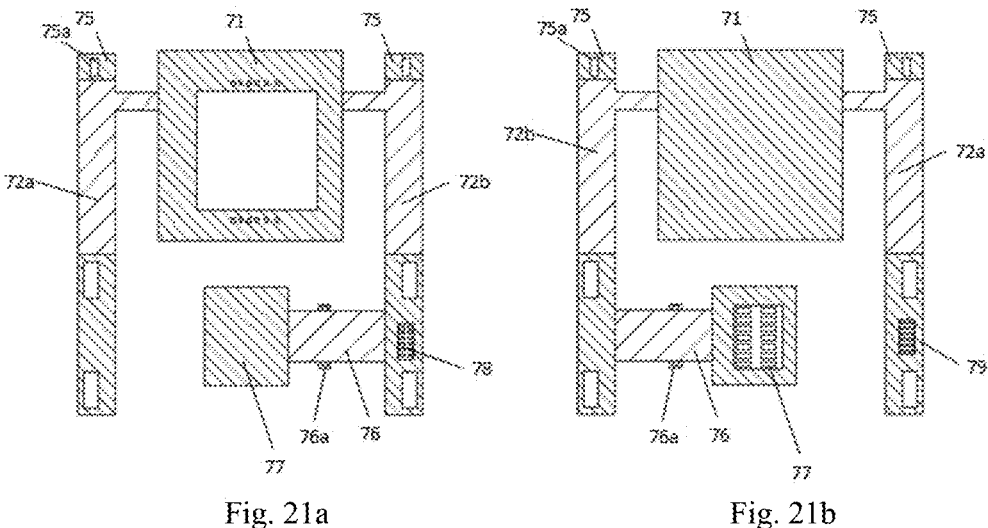
Fig. 21a                                   Fig. 21b

40

40

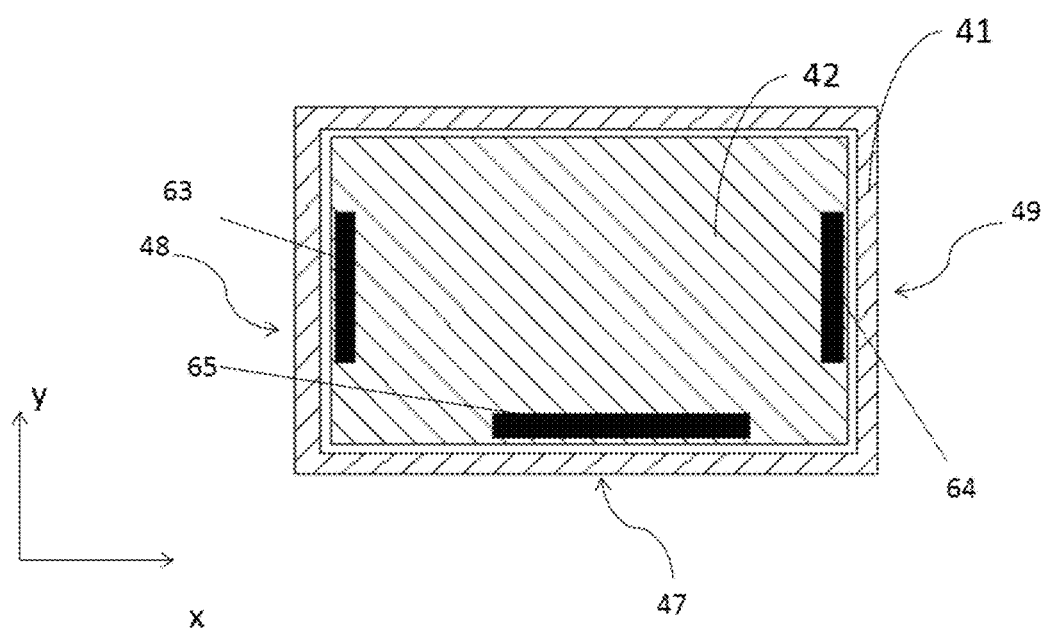
Fig. 30a
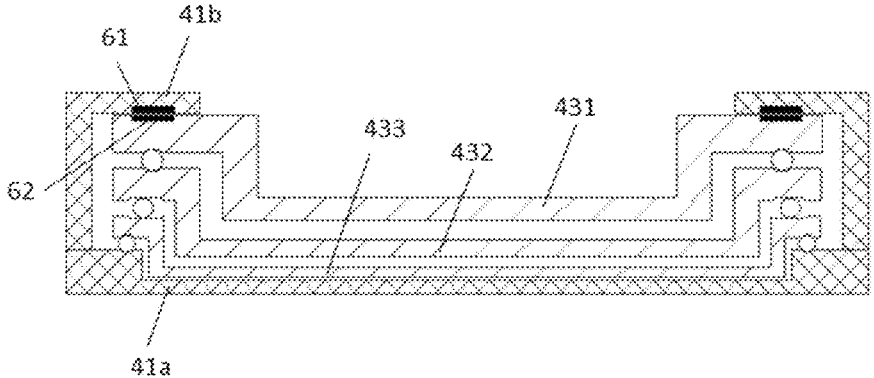
Fig. 30b
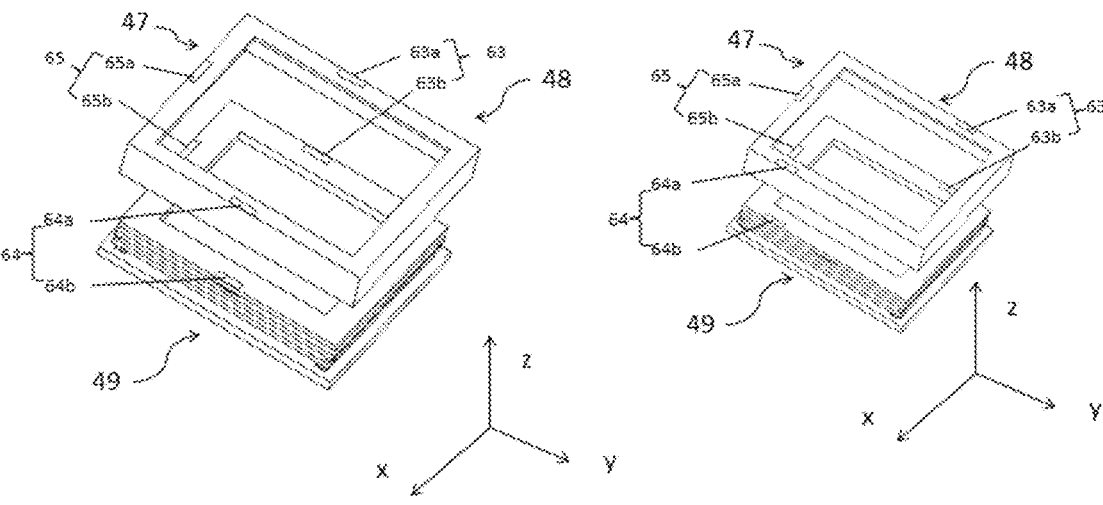
Fig. 31a                                    Fig. 31b

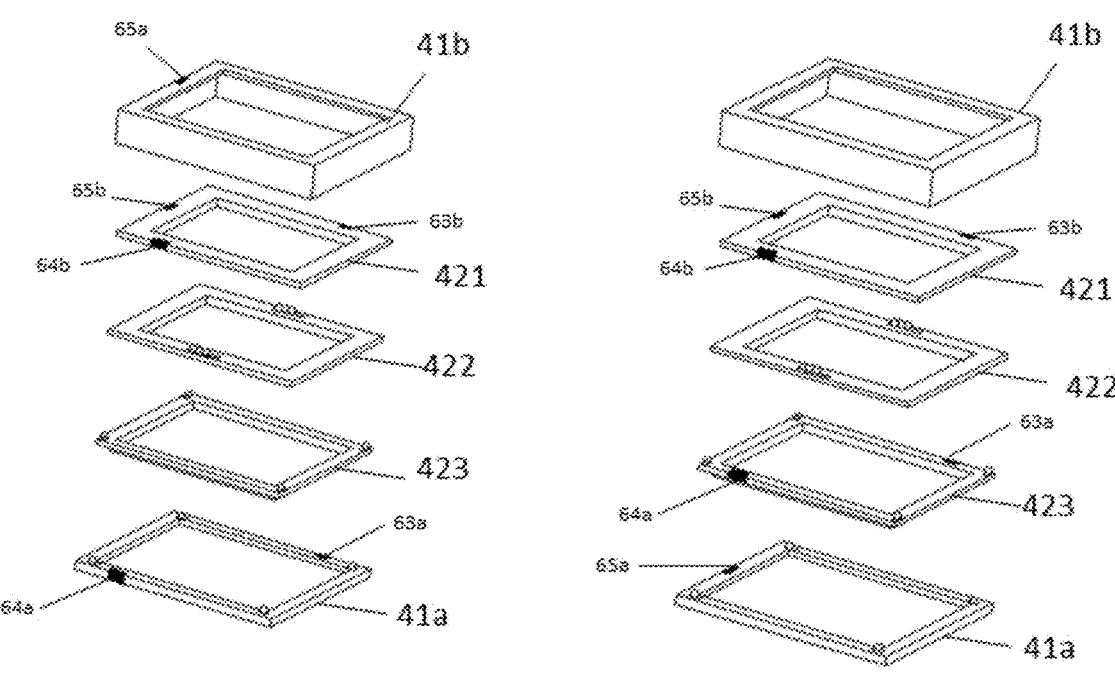
Fig. 31c                    Fig. 31d
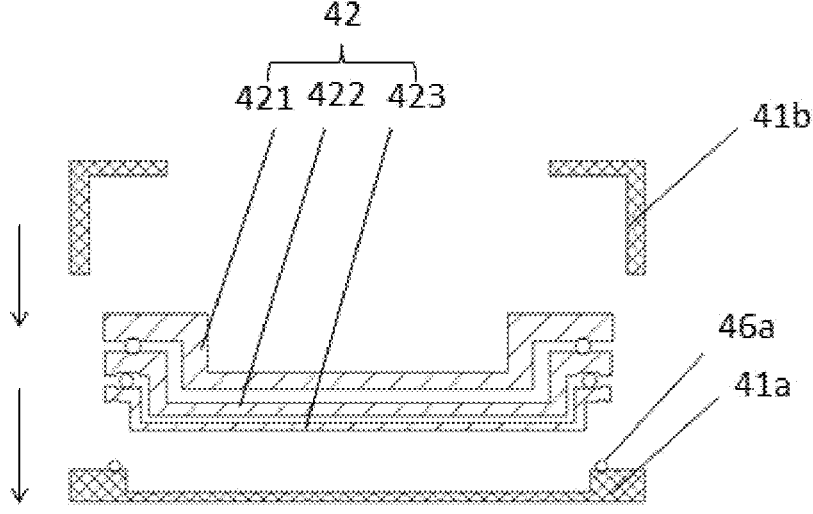
Fig. 32a

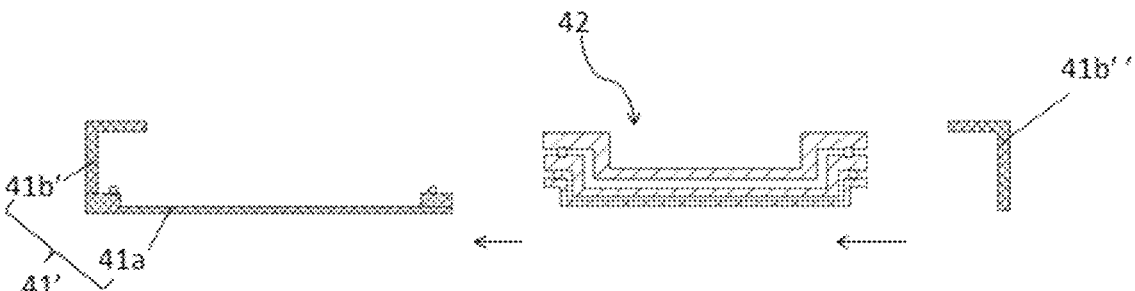
Fig. 32b
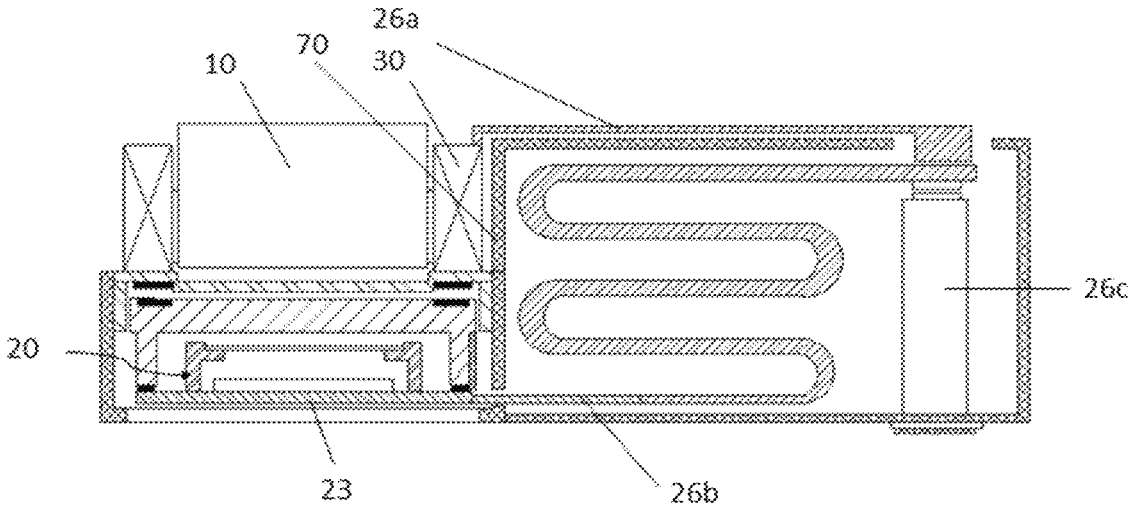
Fig. 33
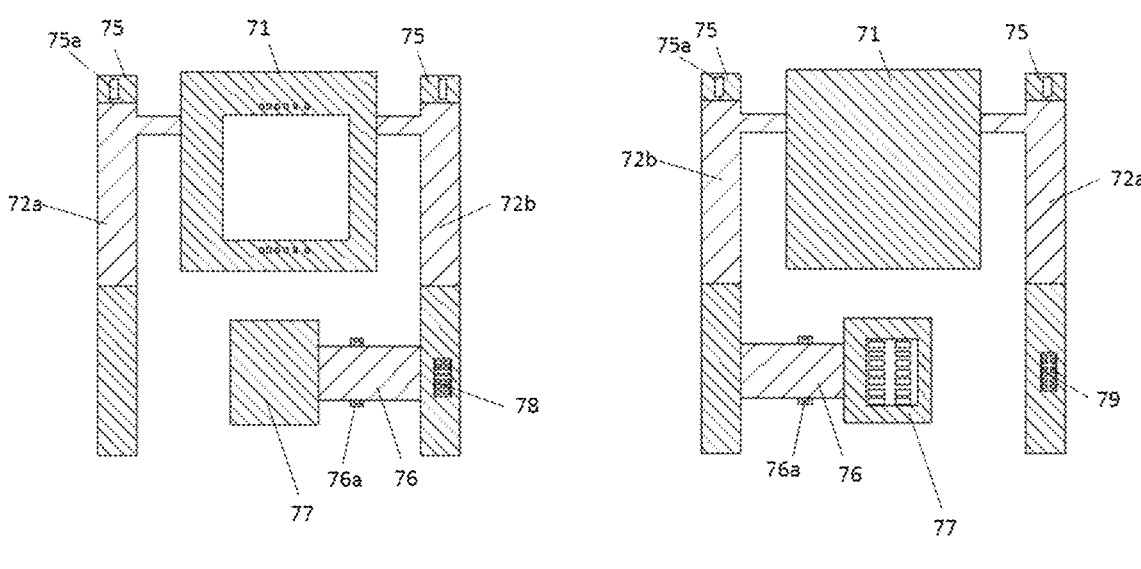
Fig. 34a                    Fig. 34b

DRIVING STRUCTURE FOR OPTICAL ACTUATOR AND CORRESPONDING CAMERA MODULE

RELATED APPLICATIONS

This application claims for the priority benefit of Chinese patent application titled "Driving Structure for Optical Actuator and Corresponding Camera Module" and filed on Nov. 25, 2020 with application number CN202011338741.2, and Chinese patent application titled "Optical Anti-shake Camera Module" and filed on Nov. 25, 2020 with application number CN202011338735.7, and the entire contents of the above applications are incorporated herein by reference.

TECHNICAL FIELD

The application relates to the technical field of camera equipment, and in particular, the application relates to a driving structure for an optical actuator and a corresponding camera module.

BACKGROUND ART

With the increasing demand of consumers for mobile phone photography, the functions of a mobile phone camera (i.e., camera module) are becoming more and more abundant. Functions such as portrait shooting, telephoto shooting, optical zoom, and optical anti-shake are all integrated into a camera with limited size, and functions such as autofocus, optical anti-shake, and optical zoom often need to rely on optical actuators (sometimes also called motors) to achieve.

FIG. 1 shows a typical camera module with a motor in the prior art. Referring to FIG. 1, the camera module generally includes: a camera lens 1, a motor mechanism 2 (referred to as a motor for short), and a photosensitive assembly 3. When the camera module is in the shooting state, the light from the object to be photographed is focused on the photosensitive element 3a of the photosensitive assembly 3 through the camera lens 1. Structurally, the camera lens 1 is fixed to the motor carrier of the motor (shown specifically in FIG. 1), which is a movable part, and it can usually drive the camera lens 1 to move in the direction of the optical axis under the action of the driving element of the motor, so as to realize the focusing function. However, for a camera module with an optical anti-shake (optical image stabilization, OIS) function, its motor often has a more complicated structure. This is because the motor needs to drive the camera lens 1 to move in other degrees of freedom (such as a direction perpendicular to the optical axis) in addition to driving the camera lens to move in the direction of the optical axis, so as to compensate for shaking during shooting. Generally speaking, the shaking of the camera module includes translation in the direction perpendicular to the optical axis (translation in the direction of the x-axis and y-axis) and rotation (referring to rotation in the xoy plane, and the direction of the rotation axis may be roughly the same as the optical axis), and tilt shake (referring to rotation around the x and y axes, in the field of camera module, tilt shake is also called tilt jitter). When a gyroscope (or other position-sensing elements) in the module detects shaking in a certain direction, it can issue a command to make the motor drive the camera lens to move a distance in the opposite direction, so as to compensate for the shaking of the camera lens. Generally speaking, the camera lens only translates and/or rotates in the direction perpendicular to the optical axis to compensate for the shaking of the camera module. This is because if the camera lens is rotated around the x and y axes, i.e., if anti-shake effect is realized by tilt adjustment of the camera lens, it may lead to a decrease in the imaging quality of the module, and even cause blurring image, which makes it difficult to meet the basic imaging quality requirements.

However, as the image quality requirements of camera modules of mobile phone are getting higher and higher, the volume and weight of the camera lens are getting larger and larger, and the driving force requirements for the motor are also getting higher and higher. However, current electronic devices (such as mobile phones) also have a great limitation on the volume of the camera module, and the volume occupied by the motor increases correspondingly with the size-increasing of the camera lens. In other words, with the trend of camera lens becoming larger and heavier, it is difficult for the driving force provided by the motor to increase accordingly. Under the premise that the driving force is limited, the heavier the camera lens, the shorter the motor can drive the camera lens to move a distance, which affects the anti-shake capability. On the other hand, the heavier the camera lens, the slower the motor can drive the camera lens to move, and the longer time it takes for the camera lens to reach the predetermined compensation position, which will also affect the anti-shake effect.

Therefore, there is an urgent need for a solution capable of improving the anti-shake stroke and anti-shake response speed of the camera module.

SUMMARY OF THE APPLICATION

The object of the present application is to overcome the deficiencies of the prior art, and provide a solution capable of improving the anti-shake stroke and anti-shake response speed of the camera module.

In order to solve the above technical problems, the present application provides a driving structure for an optical actuator, which includes: a first driving part, which is adapted to mounting a camera lens; wherein the first driving part includes a first base part, a first movable part movably connected to the first base part, and a camera lens driving coil mounted on the first movable part; a x-axis and a y-axis are coordinate axes perpendicular to an optical axis of the camera lens, and the x-axis and the y-axis are perpendicular to each other; and a second driving part, which is adapted to mounting a photosensitive assembly; wherein the second driving part includes a second base part, a second movable part and a photosensitive assembly driving coil mounted on the second movable part; the second movable part is located below the second base part and is movably connected to the second base part, the photosensitive assembly is located below the second movable part and is fixed to the second movable part; wherein the first driving part and the second driving part have a common magnet, the common magnet is arranged on a first base part or a second base part, and the photosensitive assembly includes a photosensitive chip; the first driving part drives the camera lens to translate in x-axis and y-axis directions by means of the electromagnetic induction of the camera lens driving coil and the common magnet, and the second driving part drives the photosensitive chip to translate in the x-axis and y-axis directions by means of the electromagnetic induction of a photosensitive assembly driving coil and the common magnet; and the camera lens and the photosensitive chip are configured to be driven simultaneously and move in opposite directions.

In a particular example, the first base part and the second base part are fixed by adhesive bonding.

In a particular example, the second driving part is also used to drive the photosensitive chip to rotate in the xoy plane.

In a particular example, a camera lens movement distance b of movement of the camera leans driven by the first driving part, and a photosensitive chip movement distance c of movement of the photosensitive chip driven by the second driving part, are determined by a detected tilt shaking angle a of the camera module; and wherein the camera lens movement distance b, the photosensitive chip movement distance c, and an image focal length f of the camera module satisfies the following equation: $a=\arctan(b/f)+\arctan(c/f)$.

In a particular example, the driving structure further includes a driving logic module, which is used to make a ratio between the camera lens movement distance b and the photosensitive chip movement distance c remain at a preset fixed ratio.

In a particular example, the driving structure further includes a driving logic module having an anti-shake threshold K, and the driving logic module is used to make the ratio between the camera lens movement distance b and the photosensitive chip movement distance c remain at a preset fixed ratio when the tilt shaking angle a is less than or equal to the anti-shake threshold K, and to make the photosensitive chip movement distance c reach a maximum value $c_{max}$ of a movement stroke when the tilt shaking angle a is greater than the anti-shake threshold K, and wherein the camera lens movement distance b is calculated according to the following relationship expression: $b=\tan(a/f)-c_{max}$.

In a particular example, the preset fixed ratio between the camera lens movement distance b and the photosensitive chip movement distance c is set on the basis of a weight of the camera lens, a driving force of the first driving part, a weight of the photosensitive chip or photosensitive assembly, and a driving force of the second driving part, so that the times for the camera lens and the photosensitive chip to move to the respective anti-shake target positions are same.

In a particular example, the second movable part is movably connected to the second base part through balls, and the degree of freedom for movement of the second movable part relative to the second base part is restricted within the xoy plane by a ball-based suspension system.

In a particular example, the balls are arranged at four corners of the second driving part in a top view.

In a particular example, the driving structure further includes a rear housing located below the second driving part, the rear housing is connected to the second base part to form an accommodating cavity, the second movable part and the photosensitive assembly are located in the accommodating cavity; and there is a gap between the photosensitive assembly and the bottom of the rear housing.

In a particular example, the second movable part has an extension arm extending downward, and the extension arm is bonded to the circuit board of the photosensitive assembly; the extension arm is provided with an FPC, and the FPC is directly welded to the circuit board.

In a particular example, the centers of the second movable part and the second base part both have light holes.

In a particular example, the second base part includes a base and a cover, and the cover includes a side wall formed by extending downward from the base to surround the second movable part and a supporting platform formed by extending horizontally inward from the side wall.

In a particular example, the balls and an edge region of the second movable part are clamped between the base and the supporting platform.

In a particular example, an upper surface of the second base part has a stepped structure, and the stepped structure includes a first step surface on the outside and a second step surface on the inside, the height of the second step surface is lower than the height of the first step surface.

In a particular example, an upper surface of the edge region of the second movable part has a groove, and the balls are placed in the groove.

In a particular example, the upper surface of the edge region of the second movable part has a concave step, and the outside step surface of the concave step is lower than the inside step surface, and the concave step together with the side wall of the cover and the base form an accommodating cavity for accommodating the balls.

In a particular example, the balls are located between the supporting platform and the second movable part.

In a particular example, a layer of balls are provided separately between the base and the second movable part, between the second movable part and the supporting platform.

In a particular example, an inwardly recessed slot is provided on the outer side surface of the second movable part, and the supporting platform is fitted into the slot.

In a particular example, glue is arranged between the lower end surface of the second movable part and the upper end surface of the camera lens holder of the photosensitive assembly, and the glue avoids the four corners of the second movable part.

In a particular example, the common magnet is arranged on the edge region of the second base part, and the camera lens driving coil is arranged on the edge region of the second movable part.

In a particular example, in the second driving part, the combinations of coil and magnet formed by the common magnets and the photosensitive assembly driving coils includes: a first coil-magnet pair, a second coil-magnet pair, and a third coil-magnet pair; wherein the first coil-magnet pair and the second coil-magnet pair are used to provide a driving force in the x-axis direction; the third coil-magnet pair is used to provide a driving force in the y-axis direction; and in a top view, the shape of the second driving part is rectangular, and the first coil-magnet pair and the second coil-magnet pair are respectively arranged along the first side and the second side of the second driving part, the first side and the second side do not intersect with each other, and the third coil-magnet pair is arranged along the third side of the second driving part, the third side intersects with both the first side and the second side; and the camera lens driving coils includes a first camera lens driving coil, a second camera lens driving coil, and a third camera lens driving coil respectively arranged above the first coil-magnet pair, the second coil-magnet pair, and the third coil-magnet pair; the common magnet of the first camera lens driving coil and the first coil-magnet pair, and the common magnet of the second camera lens driving coil and the second coil-magnet pair, are used to provide a driving force in the x-axis direction; and the common magnet of the third camera lens driving coil and the third coil-magnet pair is used to provide a driving force in the y-axis direction.

In a particular example, the first base part includes a motor foundation located below the first movable part, and the motor foundation has a light through hole, the common magnet is mounted on the edge region of the motor foundation, and the camera lens driving coil is mounted on the bottom of the first movable part; the magnet-coil pairs formed by the common magnets and the camera lens driving coils includes: a first coil-magnet pair, a second coil-magnet pair, and a third coil-magnet pair; wherein the first coil-magnet pair and the second coil-magnet pair are used to provide a driving force in the x-axis direction; the third coil-magnet pair is used to provide a driving force in the y-axis direction; and in a top view, the outer contour of the first driving part is rectangular, the first coil-magnet pair and the second coil-magnet pair are respectively arranged along the first side and the second side of the first driving part, the first side and the second side do not intersect with each other, and the third coil-magnet pair is arranged along a third side of the second driving part, the third side intersects with both the first side and the second side; and the photosensitive assembly driving coil includes a first photosensitive assembly driving coil, a second photosensitive assembly driving coil, and a third photosensitive assembly driving coil respectively arranged under the first coil-magnet pair, the second coil-magnet pair, and the third coil-magnet pair; the common magnet of the first photosensitive assembly driving coil and the first coil-magnet pair, and the common magnet of the second photosensitive assembly driving coil and the second coil-magnet pair, are used to provide a driving force in the x-axis direction; and the common magnet of the third photosensitive assembly driving coil and the third coil-magnet pair is used to provide the driving force in the y-axis direction.

In a particular example, in a top view, a notch or a through hole is provided at a position on the second base part corresponding to the photosensitive assembly driving coil.

In a particular example, the magnet-coil pairs formed by the common magnets and the photosensitive assembly driving coils include: a first coil-magnet pair, a second coil-magnet pair, and a third coil-magnet pair; wherein the first coil-magnet pair and the second coil-magnet pair are used to provide a driving force in the x-axis direction; the third coil-magnet pair is used to provide a driving force in the y-axis direction driving force; and in a top view, the outer contour of the second driving part is rectangular, and the first coil-magnet pair and the second coil-magnet pair are respectively arranged along the first side and the second side of the first driving part, the first side and the second side do not intersect with each other, and the third coil-magnet pair is arranged along the third side of the second driving part, the third side intersects with both the first side and the second side; the camera lens driving coils include an x-axis camera lens driving coil and a y-axis camera lens driving coil, the x-axis camera lens driving coil is located directly above the first coil-magnet pair, and the y-axis camera lens driving coil is located directly above the third coil-magnet pair.

According to another aspect of the present application, also provided is a camera module including: a camera lens; a photosensitive assembly; and a driving structure for an optical actuator according to any one of the preceding examples; wherein the camera lens is mounted on the first driving part, and the photosensitive assembly is mounted on the second driving part.

In a particular example, the photosensitive assembly includes a circuit board, and the camera module further includes a first connection belt and a second connection belt; the first connection belt is arranged on a top region of the first driving part and is electrically connected to the first driving part; and the second connection belt is conductively connected to the circuit board of the photosensitive assembly, wherein the second connection belt is provided with multiple bends to form a curved overlapped structure.

In a particular example, the first driving part includes a first base part and a first movable part, and the second driving part includes a second base part and a second movable part; wherein the second base part is fixed to the first base part, the second movable part is located below the second base part and is movably connected to the second base part, and the photosensitive assembly is located below the second movable part and is fixed to the second movable part; the photosensitive assembly includes a suspended circuit board, and the suspended circuit board includes a rigid circuit board main body and a flexible connection belt, and the connection belt is led out from the first side surface and the second side surface of the circuit board main body and is bent upward to form a bent part, and the top of the bent part extends along the periphery of the photosensitive assembly in horizontal direction, so that the connection belt surrounds around the first side surface, the second side surface and the third side surface of the photosensitive assembly, and each of the connection belts located at the periphery of the first side surface, the second side surface and the third side surface has at least one suspension part, and the suspension part is fixed to the second base part of the second driving part or fixed to the second base part through an intermediary; wherein the photosensitive assembly has a first side surface and a second side surface having a position corresponding to that of the circuit board main body, and the first side surface and the second side surface are oppositely arranged, and the third side surface intersects with both the first side surface and the second side surface.

In a particular example, the suspension part has a suspension hole, the second base part or the intermediary has a hook, and the hook hooks the suspension hole.

In a particular example, the connection belts include a third connection belt and a fourth connection belt, and the third connection belt is led out from the first side surface of the circuit board main body and is bent upward to form a bent part, then extends along the first side surface of the photosensitive assembly, and is bent in the horizontal direction at the corner and continues to extend along the third side surface; the fourth connection belt is led out from the second side surface of the circuit board main body and is bent upward to form another bent part, then extends along the second side surface of the photosensitive assembly, and is bent in the horizontal direction at the corner and continues to extend along the third side surface; the third connection belt and the fourth connection belt are joined at the third side surface and are conductively connected to each other; a fifth connection belt is also connected to the suspension part of the connection belt located on the third side surface, and the fifth connection belt has a connector for external connection; the suspended circuit board also has a fixing part for fixing the fifth connection belt.

In a particular example, the photosensitive assembly includes a circuit board, a photosensitive chip mounted on the surface of the circuit board, and a camera lens holder mounted on the surface of the circuit board and surrounding around the photosensitive chip, a filter mounted on the camera lens holder, and an electronic component mounted on the surface of the circuit board and located outside the camera lens holder; in the second driving part, the second movable part has a rigid extension arm extending downward, the extension arm is bonded to the circuit board of the photosensitive assembly, and the extension arm surrounds around the camera lens holder, and the electronic component is located in the gap between the inner side surface of the extension arm and the outer side surface of the camera lens holder; and the photosensitive assembly driving coil is electrically connected to the circuit board through the FPC, the FPC is attached to the side surface of the extension arm, and the FPC is directly welded to the circuit board.

In order to solve the above mentioned technical problems, the present application further provide an optical anti-shake camera module including: a camera lens; a photosensitive assembly, which includes a photosensitive chip; a first driving part, which is adapted to mounting the camera lens and drive the camera lens to translate in the x-axis and y-axis directions; and a second driving part, which is adapted to mounting the photosensitive assembly and drive the photosensitive chip to translate in the x-axis and y-axis directions, the camera lens and the photosensitive chip are configured to be driven simultaneously and move in opposite directions, wherein x axis and y-axis are two coordinate axes perpendicular to the optical axis direction of the camera module, and the x-axis and y-axis are perpendicular to each other; wherein the second driving part includes a second base part and a second movable part, the second base part includes a base part substrate and a cover; the second movable part includes at least two chip-end carriers arranged from bottom to top; multiple guiding grooves are provided on the base part substrate and at least two chip-end carriers, and the guiding grooves include a first guiding groove and a second guiding groove; the upper surface of the base part substrate or the lower surface of the chip-end carrier at the bottom of the second movable part has the first guiding groove; a first ball is arranged in the first guiding groove, and the first ball can roll along the first guiding groove, the upper surface of the base part substrate and the chip-end carrier at the bottom of the second movable part are supported by the first ball; in the second movable part, for any two vertically adjacent chip-end carriers, the upper surface of the lower chip-end carrier or the lower surface of the upper chip-end carrier has the second guiding groove; a second ball is provided in the second guiding groove, and the second ball rolls along the second guiding groove, the upper surface of the lower chip-end carrier and the lower surface of the upper chip-end carrier are supported by the second ball; the photosensitive assembly is mounted on the chip-end carrier at the top of the second movable part; and the guiding direction of at least one guiding groove of the plurality of guiding grooves is a direction of translation along the x-axis, and the guiding direction of at least one guiding grooves of the plurality of guiding grooves is a direction of translation along the y-axis.

In a particular example, the guiding direction of the first guiding groove is a translational direction along the x-axis or y-axis, and the guiding direction of the second guiding groove of one of the chip-end carriers is perpendicular to the guiding direction of the first guiding groove.

In a particular example, the chip-end carriers include a first chip-end carrier, a second chip-end carrier, and a third chip-end carrier arranged sequentially from top to bottom; the second guiding groove includes an arc-shaped guiding groove and a straight-line guiding groove; the arc-shaped guiding groove is used to guide the second ball to roll along an arc rotating around z-axis, wherein the z-axis is a coordinate axis in the same direction as the optical axis; the straight-line guiding groove is used to guide the second ball to roll along the x-axis or y-axis.

In a particular example, in the second movable part, for any two vertically adjacent chip-end carriers, the lower surface of the upper chip-end carrier or the upper surface of the lower chip-end carrier has a second fitting groove, and the second fitting groove fits with the second guiding groove and they jointly constitute a guiding channel for the second ball.

In a particular example, the arc center of the arc-shaped guiding groove is located directly below the photosensitive center, wherein the photosensitive center is the center of the photosensitive region of the photosensitive chip.

In a particular example, each of the chip-end carriers includes a carrier substrate and a carrier wall extending upward from the edge region of the carrier substrate, and the carrier wall surrounds around the photosensitive assembly.

In a particular example, the second guiding groove is located on the upper surface of the carrier wall; for any two vertically adjacent chip-end carriers, the lower surface of the carrier wall of the upper chip-end carrier is supported by the second ball.

In a particular example, the carrier wall includes a wall body and an extension part formed by extending outward from the top region of the wall body; for any two vertically adjacent chip-end carriers, the second guiding groove is located on the upper surface of the extension part of the lower chip-end carrier, and the lower surface of the extension part of the upper chip-end carrier is supported by the second ball.

In a particular example, for any two vertically adjacent chip-end carriers, the wall body of the lower chip-end carrier surrounds around the wall body of the upper chip-end carrier; and there is a gap between the wall bodies of the two chip-end carriers.

In a particular example, each of the chip-end carriers includes a ring-shaped carrier wall surrounding around the photosensitive assembly, and the second guiding groove is located on the upper surface of the carrier wall.

In a particular example, at least one of the chip-end carriers is a frame structure formed solely by the carrier wall.

In a particular example, in the second movable part, a part of the chip-end carrier is a frame structure formed solely by the carrier wall, and the other part of the chip-end carrier includes a carrier substrate and the carrier wall extending upward from an edge region of the carrier substrate.

In a particular example, in the second movable part, the uppermost chip-end carrier includes the carrier substrate and the carrier wall, the photosensitive assembly is installed in an accommodation groove formed by the carrier substrate and the carrier wall.

In a particular example, the lower surface of the chip-end carrier located at the bottom of the second movable part or the upper surface of the base part substrate has a first fitting groove, the first fitting groove fits with the first guiding groove and they jointly constitute a guiding channel for the first ball.

In a particular example, the second balls include an upper layer second ball and a lower layer second ball; the upper layer second ball is arranged between the lower surface of the first chip-end carrier and the upper surface of the second chip-end carrier; the lower layer second ball is arranged between the lower surface of the second chip-end carrier and the upper surface of the third chip-end carrier.

In a particular example, the first ball is arranged between the lower surface of the third chip-end carrier and the upper surface of the base part substrate.

In a particular example, the arc-shaped guiding groove is located on the lower surface of the first chip-end carrier or the upper surface of the second chip-end carrier; the straight-line guiding groove is located on the lower surface of the second chip-end carrier or the upper surface of the third chip-end carrier.

In a particular example, the cover includes a cover side wall and a supporting platform formed by extending inward from the top region of the cover side wall; the bottom of cover side wall is connected to the base part substrate, the supporting platform is located above the first chip-end carrier, and there is a gap between the lower surface of the supporting platform and the upper surface of the first chip-end carrier.

In a particular example, in a top view, the shape of the chip-end carrier is rectangular, and the edge region of the chip-end carrier includes a first side, a second side opposite to the first side, a third side intersecting with the first side, and a fourth side opposite to the third side; the length of the first side and the second side is greater than that of the third side and the fourth side; in a top view, the arc-shaped guiding groove is arranged on the first side and the second side.

In a particular example, in a top view, the straight-line guiding grooves are arranged on the four corner regions of the chip-end carrier.

In a particular example, in a top view, the shape of the second base part is rectangular; the first guiding grooves are arranged on the four corner regions of the second base part or the chip-end carrier.

In a particular example, the driving element of the second driving part is a coil-magnet combination, wherein the magnets in the coil-magnet combination are all mounted on the edge region of the second base part, the coils in the coil-magnet combination are all mounted on the edge region of the first chip-end carrier; the combinations of coil and magnet include a first coil-magnet pair, a second coil-magnet pair and a third coil-magnet pair; wherein the first coil-magnet pair and the second coil-magnet pair are used to provide a driving force in the x-axis direction; the third coil-magnet pair is used to provide a driving force in the y-axis direction; and in a top view, the first coil-magnet pair and the second coil-magnet pair may be respectively arranged along the first side and the second side of the second driving part, the first side and the second side do not intersect with each other, and the third coil-magnet pair is arranged along the third side of the second driving part, the third side intersects with both the first side and the second side.

In a particular example, the cover includes a cover side wall and a supporting platform formed by extending inward from the top region of the cover side wall; the bottom of the cover side wall is connected to the base part substrate, the supporting platform is located above the first chip-end carrier, and there is a gap between the lower surface of the supporting platform and the upper surface of the first chip-end carrier; wherein the magnets in the coil-magnet combination are mounted on the cover, the base part substrate or the third chip-end carrier; and wherein the magnet in the first coil-magnet pair and the magnet in the second coil-magnet pair are mounted in the same component which is one of the cover, the base part substrate, and the third chip-end carrier.

In a particular example, the magnet of the first coil-magnet pair is arranged on the side of the first side close to the third side, and the magnet of the second coil-magnet pair is arranged on the side of the second side away from the third side.

In a particular example, the camera lens movement distance b of movement of the camera lens driven by the first driving part, and photosensitive chip movement distance c of movement of the photosensitive chip driven by the second driving part, are determined by the detected tilt shaking angle a of the camera module; and wherein the camera lens movement distance b, photosensitive chip movement distance c, and the image focal length f of the camera module satisfies the following equation: $a=\arctan(b/f)+\arctan(c/f)$.

In a particular example, the driving structure further includes a driving logic module, which is used to make the ratio between the camera lens movement distance b and the photosensitive chip movement distance c remain at a preset fixed ratio.

In a particular example, the driving structure further includes a driving logic module having an anti-shake threshold K, and the driving logic module is used to make the ratio between the camera lens movement distance b and the photosensitive chip movement distance c remain at a preset fixed ratio when the tilt shaking angle a is less than or equal to the anti-shake threshold K, and to make the photosensitive chip movement distance c reach the maximum value $c_{max}$ of the movement stroke when the tilt shaking angle a is greater than the anti-shake threshold K, and wherein the camera lens movement distance b is calculated according to the following relationship expression: $b=\tan(a/f)-c_{max}$.

In a particular example, the preset fixed ratio between the camera lens movement distance b and the photosensitive chip movement distance c is set on the basis of the weight of the camera lens, the driving force of the first driving part, the weight of the photosensitive chip or photosensitive assembly, and the driving force of the second driving part, so that the times for the camera lens and the photosensitive chip to move to the respective anti-shake target positions are same.

In a particular example, the first driving part includes a first base part and a first movable part, and the first base part is fixed to the second base part together.

In a particular example, the photosensitive assembly includes a circuit board, and the camera module further includes a first connection belt and a second connection belt; the first connection belt is arranged on the top region of the first driving part and is electrically connected to the first driving part; and the second connection belt is conductively connected to the circuit board of the photosensitive assembly, wherein the second connection belt is provided with multiple bends to form a curved overlapped structure.

In a particular example, the first driving part includes a first base part and a first movable part, and the second driving part includes a second base part and a second movable part; wherein the second base part is fixed to the first base part, the second movable part is located below the second base part and is movably connected to the second base part, and the photosensitive assembly is located below the second movable part and is fixed to the second movable part; the photosensitive assembly includes a suspended circuit board, and the suspended circuit board includes a rigid circuit board main body and a flexible connection belt, and the connection belt is led out from the first side surface and the second side surface of the circuit board main body and is bent upward to form a bent part, and the top of the bent part extends along the periphery of the photosensitive assembly in horizontal direction, so that the connection belt surrounds around the first side surface, the second side surface and the third side surface of the photosensitive assembly, and each of the connection belts located at the periphery of the first side surface, the second side surface and the third side surface has at least one suspension part, and the suspension part is fixed to the second base part of the second driving part or fixed to the second base part through an intermediary; wherein the photosensitive assembly has a first side surface and a second side surface having a position corresponding to that of the circuit board main body, and the first side surface and the second side surface are oppositely arranged, and the third side surface intersects with both the first side surface and the second side surface.

In a particular example, the connection belts include a third connection belt and a fourth connection belt, and the third connection belt is led out from the first side surface of the circuit board main body and is bent upward to form a bent part, then extends along the first side surface of the photosensitive assembly, and is bent in the horizontal direction at the corner and continues to extend along the third side surface; the fourth connection belt is led out from the second side surface of the circuit board main body and is bent upward to form another bent part, then extends along the second side surface of the photosensitive assembly, and is bent in the horizontal direction at the corner and continues to extend along the third side surface; the third connection belt and the fourth connection belt are joined at the third side surface and are conductively connected to each other; a fifth connection belt is also connected to the suspension part of the connection belt located on the third side surface, and the fifth connection belt has a connector for external connection; the suspended circuit board also has a fixing part for fixing the fifth connection belt.

Compared with the prior art, the present application has at least one of the following technical effects:

1. The application can improve the anti-shake stroke of the camera module, so as to compensate for the larger shake of the camera module.
2. The application can improve the anti-shake response speed of the camera module.
3. The driving structure for the optical actuator of the present application has the advantage of compact structure, and is especially suitable for miniaturized camera modules.
4. In some examples of the present application, it may be configured based on factors such as the weight of the camera lens, the driving force of the first driving part, the weight of the photosensitive chip (or photosensitive assembly), the driving force of the second driving part, so that the time of the camera lens and the photosensitive chip to respectively move to its anti-shake target position is basically the same, thereby obtaining better anti-shake effect.
5. In some examples of the present application, the interference of the connection belt to the anti-shake movement of the photosensitive assembly may be reduced by a suspended circuit board, thereby effectively guaranteeing the anti-shake stroke and response speed.
6. In some examples of the present application, the volume occupied for installing the magnets in the first base part or the second base part may be reduced by sharing the magnets, thereby facilitating the anti-shake camera module to achieve reduction in height.

BRIEF DESCRIPTION OF THE DRAWINGS

FIG. 4 shows a schematic diagram of the relationship between the movement distance of the camera lens and photosensitive chip and the tilt angle of the module under four different situations in the present application;

FIG. 5 shows a schematic cross-section view of a camera module according to an example of the present application;

FIG. 6 shows a schematic cross-section view of a camera module according to another example of the present application;

FIG. 11b shows a schematic diagram of the assembly of a second driving part according to an example of the present application;

FIG. 11c shows a schematic cross-section view of a second driving part according to another example of the present application;

FIG. 12 shows a schematic cross-section view of a second driving part according to yet another example of the present application;

FIG. 13a shows a schematic bottom view of the movable part of a second driving part according to an example of the present application;

FIG. 13b shows a schematic bottom view of the movable part of a second driving part according to another example of the present application;

FIG. 15e shows a schematic perspective view of a second driving part with a notch in the second base part;

FIG. 15f shows a schematic exploded perspective view of a second driving part with a notch in the second base part;

FIG. 15g shows a schematic perspective view of a second driving part with a through hole in the second base part;

FIG. 15*h* shows a schematic exploded perspective view of a second driving part with a through hole in the second base part;

FIG. 19 shows a schematic exploded view of a second driving part and a photosensitive assembly according to one example of the present application;

FIG. 20 shows a schematic perspective view of a photosensitive assembly and the suspended circuit board used therein according to an example of the present application;

FIG. 21*a* shows a schematic front view of a suspended circuit board according to an example of the present application after being expanded;

FIG. 21*b* shows a schematic back view of a suspended circuit board according to an example of the present application after being expanded;

FIG. 30*a* shows the installation position of the driving element of a second driving part in a top view according to an example of the present application;

FIG. 30*b* shows a schematic cross-section view of a second driving part including a driving element according to an example of the present application;

FIG. 31*a* shows a schematic exploded perspective view of a second driving part showing the position of the coil and the magnet according to an example of the present application;

FIG. 31*b* shows a schematic exploded perspective view of a second driving part showing the position of the coil and the magnet according to another example of the present application;

FIG. 31*c* shows a schematic exploded perspective view of a second driving part showing the position of the coil and the magnet according to a modified example of the present application;

FIG. 31*d* shows a schematic exploded perspective view of a second driving part showing the position of the coil and the magnet according to another modified example of the present application;

FIG. 32*a* shows a schematic diagram of the assembly method of a second driving part before assembly according to an example of the present application;

FIG. 32*b* shows a schematic diagram of the assembly method of a second driving part before assembly according to another example of the present application;

FIG. 33 shows the layout of a camera module and its connection belt according to an example of the present application;

FIG. 34*a* shows a schematic front view of a suspended circuit board according to another example of the present application after being expanded;

FIG. 34*b* shows a schematic back view of a suspended circuit board according to an example of the present application after being expanded;

DETAILED DESCRIPTION OF THE APPLICATION

Figure 1:
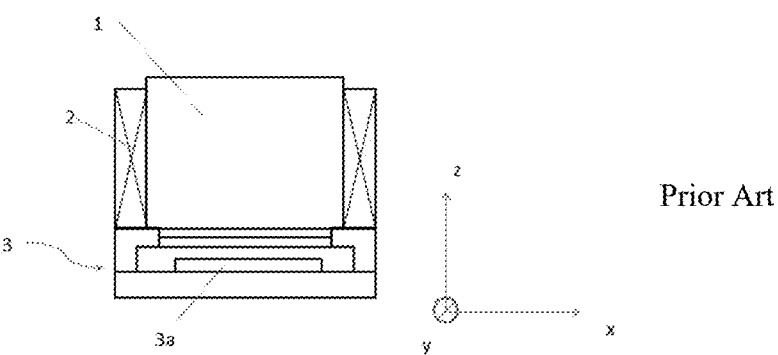
FIG. 1 shows a typical conventional camera module with a motor.

For a better understanding of the application, various aspects of the application will be described in more detail with reference to the accompanying drawings. It should be understood that these detailed descriptions are illustration of exemplary examples of the application only, and are not intended to limit the scope of the application in any way. Throughout the specification, the same reference numerals refer to the same elements. The expression "and/or" includes any one and all combinations of one or more of the associated listed items.

It should be noted that in this specification, expressions of a first, a second, etc. are only used to distinguish one feature from another, and do not represent any limitation on the features. Accordingly, a first body discussed hereinafter may also be referred to as a second body without departing from the teachings of the present application.

In the drawings, the thickness, size and shape of objects have been slightly exaggerated for convenience of illustration. The drawings are examples only, and are not strictly drawn to scale.

It should also be understood that the terms "comprise", "comprising", "has", "include" and/or "including", when used in this specification, means that there are the stated features, integers, steps, operations, elements and/or components, but does not exclude the presence or addition of one or more other features, integers, steps, operations, elements, components and/or combinations thereof. Additionally, when words like the expression "at least one of . . . " appears before a list of listed features, it modifies the entire listed feature instead of modifying the individual elements of the list. In addition, when describing the examples of the present application, the use of "may" means "one or more examples of the present application". Also, the wording "exemplary" is intended to mean an example or illustration.

As used herein, the terms "substantially", "about", and similar terms are used as terms of approximation, not as terms of degree, and are intended to illustrate the inherent bias of a measured value or calculated value that would be recognized by a person skilled in the art.

Unless otherwise defined, all terms (including technical terms and scientific terms) used herein have the same meaning as commonly understood by a person skilled in the art to which this application belongs. It should also be understood that terms (such as those defined in commonly used dictionaries) should be interpreted to have a meaning consistent with their meaning in the context of the relevant art, and will not be interpreted in an idealized or overly formal sense unless it is expressly defined herein.

It should be noted that, in the case of no conflict, the examples in the present application and the features in these examples may be combined with each other.

The present application will be further described below in conjunction with the accompanying drawings and specific examples.

Figure 2:
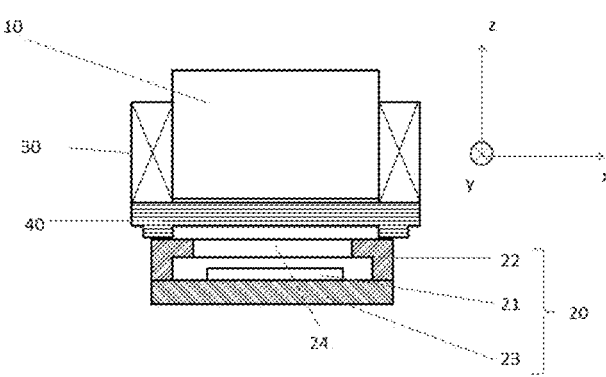
FIG. 2 shows a schematic cross-section view of a camera module with an anti-shake function according to an example of the present application.

FIG. 2 shows a schematic cross-section view of a camera module with an anti-shake function according to an example of the present application. Referring to FIG. 2, in this example, the camera module includes a camera lens 10, a photosensitive assembly 20, a first driving part 30 and a second driving part 40. The photosensitive assembly 20 includes a photosensitive chip 21. The first driving part 30 is configured to drive the camera lens 10 to move in both x and y directions, and the second driving part 40 is configured to drive the photosensitive chip 21 to move in both x and y directions. In this example, the x and y directions are perpendicular to each other, and parallel to the photosensitive surface of the photosensitive assembly 20. The z direction is parallel to the normal direction of the photosensitive surface. For ease of understanding, FIG. 2 also shows a three-dimensional rectangular coordinate system constructed based on the x, y, and z directions. In this example, the optical anti-shake of the camera module is achieved by simultaneously driving the camera lens 10 and the photosensitive chip 21 to move in opposite directions by the control module. Particularly, the camera lens 10 and the photosensitive chip 21 are configured to be driven simultaneously and move in opposite directions. For example, when the camera lens 10 is driven to move toward the positive direction of the x-axis, the photosensitive chip 21 is driven to move toward the negative direction of the x-axis; when the camera lens 10 is driven to move toward the positive direction of the y-axis, the photosensitive chip 21 is driven to move toward the negative direction of the y-axis; alternatively, when the camera lens 10 is driven to move toward a direction of the x-axis and y-axis, the photosensitive chip 21 is driven simultaneously to move toward a direction opposite to the movement direction of the camera lens 10 at the x-axis and y-axis, in other words, when the camera lens 10 needs to move simultaneously at the x-axis and y-axis, the direction of the displacement vector of the camera lens 10 and the displacement vector of the photosensitive chip 21 in the xoy plane are opposite. A camera module usually includes a position sensor, which is used to detect shaking of the camera module or a terminal device (i.e., an electronic device equipped with the camera module, e.g., a mobile phone). When shaking is detected, the position sensor sends a signal to the camera module to drive the camera lens 10 and the photosensitive chip 21 to make corresponding movements to compensate for the shaking, thereby achieving the purpose of optical anti-shake. In this example, the camera lens 10 and the photosensitive chip 21 are configured to move simultaneously, and the camera lens 10 and the photosensitive chip 21 move in opposite directions, so as to achieve faster response and better anti-shake effect. In addition, usually the anti-shake angle range of the camera module is limited by the suspension system and the drive system, and it is impossible to achieve a relatively large compensation angle range. In this example, the camera lens 10 and the photosensitive chip 21 are driven to move in opposite directions, thereby achieving large-angle shaking compensation. In addition, in this example, compared with the solution of driving only the camera lens 10 to move, by simultaneously driving the camera lens 10 and the photosensitive chip 21 to move in opposite directions, there is a larger relative movement stroke between the camera lens 10 and the photosensitive chip 21 (for convenience of description, this relative movement stroke may be referred to as the anti-shake stroke), which can achieve a better compensation effect. In particular, due to the increase of the anti-shake stroke, this example also has a better compensation effect on the tilt shake of the camera module. Further, the movement direction of the anti-shake movement in this example may be limited in the xoy plane, without tilting the optical axis of the camera lens 10 or the photosensitive chip 21, thereby avoiding the blurring problem caused by the anti-shake movement.

Further, in another example of the present application, the photosensitive chip 21 can also be driven to rotate in the xoy plane by the second driving part 40, thereby realizing compensation for shaking in the rotation direction of the camera module.

Further, still referring to FIG. 2, in an example of the present application, the camera module includes the first driving part 30, the camera lens 10, the second driving part 40 and the photosensitive assembly 20. The camera lens 10 is mounted on the first driving part 30. The first driving part 30 may have a cylindrical first motor carrier, which may serve as a movable part of the first driving part, and the camera lens is mounted on the inner side surface of the first motor carrier. The first driving part also has a stationary part, or called as a base part. In this example, the base part may be implemented as a motor housing, which may include a foundation and a cover; wherein the foundation has a light hole. The movable part is movably connected to the base part. The driving element may be a coil-magnet combination, which may be mounted between the movable part and the base part. For example, it may be installed between the first motor carrier and the motor housing. In fact, the first driving part in this example can directly adopt the common structure of the conventional optical anti-shake motor. Further, in this example, the second driving part 40 may be supported and fixed to the bottom surface of the first driving part 30. The second driving part 40 may also include a base part and a movable part, wherein the base part is directly connected to the first driving part. The movable part is located below the base part and is movably connected to the base part. The photosensitive assembly 20 includes a circuit board 23, the photosensitive chip 21 mounted on the surface of the circuit board, and a camera lens holder 22 surrounding the photosensitive chip 21. The bottom of the camera lens holder 22 may be mounted on the surface of the circuit board 23, and the top surface may be fixed to the movable part of the second driving part 40. The center of the camera lens holder 22 has a light hole, and a filter 24 is mounted on the camera lens holder 22 (the filter 24 can also be regarded as a component of the photosensitive assembly 20). Driven by the movable part of the second driving part 40, the photosensitive assembly 20 can translate in the x and y directions or rotate in the xoy plane relative to the base part. For convenience of description, in this application the base part of the first driving part 30 is sometimes called the first base part, the base part of the second driving part 40 is called the second base part; and the movable part of the first driving part 30 is called the first movable part, the movable part of the second driving part 40 is called the second movable part.

Figure 3:
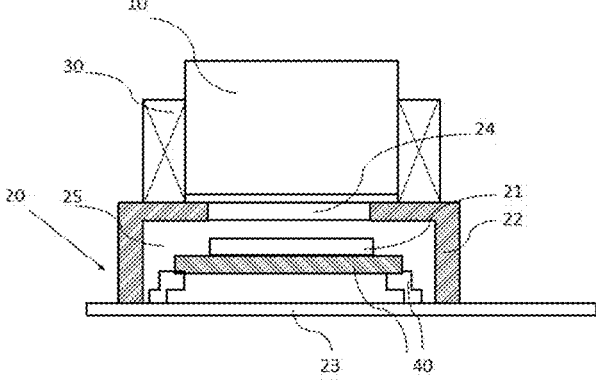
FIG. 3 shows a schematic cross-section view of a camera module with an anti-shake function according to another example of the present application.

FIG. 3 shows a schematic cross-section view of a camera module with an anti-shake function according to another example of the present application. In this example, the camera module includes a first driving part 30, a camera lens 10, a second driving part 40 and a photosensitive assembly 20. The camera lens 10 is mounted on the first driving part 30. The structure and assembly method of the first driving part 30 and the camera lens 10 may be consistent with the previous example shown in FIG. 2, and it will not be repeated herein. The difference of this example relative to the previous example lies in that: the second driving part 40 is located inside the photosensitive assembly 20. In this example, the photosensitive assembly 20 includes a circuit board 23, a camera lens holder 22, a filter 24, and a photosensitive chip 21. The bottom of the camera lens holder 22 may be mounted on the surface of the circuit board 23, and the top surface may be fixed to the base part of the first driving part 30. The center of the camera lens holder 22 has a light hole, and a filter 24 is mounted on the camera lens holder 22. The camera lens holder 22, the optical filter 24, and the circuit board 23 can form a cavity, and the photosensitive chip 21 is located in the cavity 25. In this example, the second driving part 40 may also be located in the cavity 25. Particularly, the base part of the second driving part 40 may be mounted on the surface of the circuit board 23, and the movable part of the second driving part 40 may be movably connected to the base part. The photosensitive chip 21 is mounted on the surface of the movable part. In this way, driven by the movable part of the second driving part 40, the photosensitive chip 21 can translate in the x and y directions or rotate in the xoy plane relative to the base part.

Different implementations of the structure of the second driving part of the camera module according to the present application are described in conjunction with the two examples. The method of compensating the tilt shake of the camera module based on the design concept of the present application will be further described below.

FIG. 4 shows a schematic diagram of the relationship between the movement distance of the camera lens and photosensitive chip and the tilt angle of the module under four different situations in the present application. Position A in FIG. 4 represents a combination of the movement distance of the camera lens and photosensitive chip for compensating the shaking angle a of the camera module. As shown in FIG. 4, the movement distance of the camera lens in FIG. 4 is b, and the movement distance of the photosensitive chip (hereinafter sometimes referred to as chip) is c, and the movement distance of the camera lens or chip may be equivalent to the angle at which the image plane deviates from the optical axis during optical imaging. Particularly, when the translation distance of the camera lens in the xoy plane is b, it will result in an arithmetic relationship between deviation angle $\alpha 1$ of the image plane and the image distance, and the image distance is different at different shooting distances. For convenience of calculation and expression, herein the image distance is replaced by the image focal length. Particularly, the resulting relationship between the deviation angle $\alpha 1$ of the image plane and the image focal length f of the camera lens is: $\tan(\alpha 1)=b/f$, when the translation distance of the photosensitive chip in the xoy plane is c, it will result in the following arithmetic relationship between deviation angle $\alpha 2$ of the image plane and the image distance: $\tan(\alpha 2)=c/f$. In this example, the movement directions of the camera lens and the photosensitive chip are opposite, so the calculation method of the comprehensive compensation angle a of the camera module is: $a=\alpha 1+\alpha 2=\arctan(b/f)+\arctan(c/f)$. In one example, the movement distances of the camera lens and the photosensitive chip may be set to be the same, i.e., $b=c$. In another example, the movement distances of the camera lens and the photosensitive chip may be set to be unequal, for example, the movement distance of the camera lens may be greater than that of the photosensitive chip, i.e., $b>c$. In this example, the second driving part may choose a driver with a small size (such as a MEMS driver, etc., and the movable stroke of this kind of driver is usually relatively small), thereby facilitating the overall miniaturization of the camera module.

Further, in an example of the present application, the ratio of the movement distance of the camera lens to the movement distance of the photosensitive chip can optionally be set to maintain a fixed ratio, such as $b/c=6:4$, or $b/c=7:3$, or $b/c=5:5$, no matter how much the compensation value for shaking of the camera module (e.g., the comprehensive compensation angle a) is, the movement distances of the camera lens and the photosensitive chip will keep the preset ratio, which is beneficial to achieving an uniform compensation effect for the camera module within the compensable range, and is also beneficial to reducing the design difficulty of the logic module for driving of the anti-shake system of the camera module.

Further, in the configuration where the anti-shake movement is conducted based on a fixed ratio of the movement distances of the camera lens and the photosensitive chip, since the movable range of the photosensitive chip is small, sometimes the shaking of the camera module may exceed the maximum movement stroke of photosensitive chip. Therefore, in an example of the present application, an anti-shake threshold may be set. For example, for the shaking angle a that needs to be compensated, a threshold K may be set. When the actually calculated shaking angle a is less than or equal to the anti-shake threshold K, the ratio of the movement distance of the camera lens b and that of the photosensitive chip c is kept at a fixed ratio, which may be preset, for example, $b/c=6:4$, or $b/c=7:3$, or $b/c=5:5$. Additionally, when the actually calculated shaking angle a is greater than the anti-shake threshold K, the movement distance of the photosensitive chip c takes the maximum value of its movement stroke, i.e., the maximum stroke $c_{max}$ of the photosensitive chip, and the movement distance of the camera lens $b=\tan(a/f)-c_{max}$. In other words, when the shaking angle that needs to be compensated for the camera module is above the anti-shake threshold K, based on a preset fixed ratio, the camera lens moves to a position corresponding to the maximum movement distance of the photosensitive chip (i.e., the maximum stroke $c_{max}$ of the photosensitive chip), the first driving part can drive the camera lens to continue moving until the movement distance of the camera lens $b=\tan(a/f)-c_{max}$. At the same time, the photosensitive chip first synchronously moves to the opposite direction to the maximum movement distance $c_{max}$ of the photosensitive chip, and then remains still.

Further, in another example of the present application, in the xoy plane, the anti-shake angle corresponding to the maximum stroke $b_{max}$ of camera lens movement (the anti-shake angle refers to the tilt shaking angle of the camera module) may be smaller than the anti-shake angle corresponding to the maximum stroke of the photosensitive chip $c_{max}$. Under this design, the anti-shake system of the camera module can have a faster response speed. In high-end camera lens, the camera lens often has a large number of lens. For example, the number of lens in the rear main camera lens of a smartphone can reach 8. In order to further improve the imaging quality, some camera lens also use glass lens. These all lead to a heavy weight of the camera lens. When the driving force does not increase significantly, the speed at which the driving device drives the camera lens to move will decrease. The weight of the photosensitive chip or photosensitive assembly is relatively light, and can reach the preset position with a small driving force. Therefore, in the solution of this example, the advantages of relatively close weights and faster movement speeds of the photosensitive chip and photosensitive assembly may be better utilized to effectively improve the response speed of the anti-shake system of the camera module.

Further, in another example of the present application, the fixed ratio between the movement distance of the camera lens and that of the photosensitive chip may be set based on the factors including weight of the camera lens, the driving force of the first driving part, the weight of the photosensitive chip (or photosensitive assembly), the driving force of the second driving part, and setting an appropriate fixed ratio can make the time for the camera lens and the photosensitive chip to move to their respective anti-shake target positions to be basically the same, thereby obtaining a better anti-shake effect. Particularly, the weight of the camera lens and the driving force of the first driving part can substantively determine the movement speed of the camera lens, while the weight of the photosensitive chip (or photosensitive assembly) and the driving force of the second driving part can substantively determine the movement speed of the photosensitive chip. If the movement speed of the camera lens is lower than the movement speed of the photosensitive chip (for example, in case that the weight of the camera lens is large), when setting the fixed ratio, the movement distance of the photosensitive chip can occupy a larger proportion, so that the feature of the faster movement speed of the photosensitive chip may be utilized to make the photosensitive chip move a longer distance, thereby the time for the camera lens and photosensitive chip to move to their respective anti-shake target positions is basically the same.

Further, in another example of the present application, the first driving part may adopt a driving element with a relatively large driving force and a suspension system with a large stroke. For example, the first driving part may be driven by an SMA (shape memory alloy) element. Compared with the traditional coil-magnet combination, the SMA element can provide a larger driving force with a smaller occupied space, so that the first driving part may be designed more compact, thereby facilitating miniaturization of the camera module.

Further, FIG. 5 shows a schematic cross-section view of a camera module according to an example of the present application. Referring to FIG. 5, in this example, the second base part 41 of the second driving part 40 is fixed together with the base part (not specifically shown in FIG. 5) of the first driving part 30. The camera lens 10 may be mounted on a movable part of the first driving part 30 (for example, a first motor carrier, not specifically shown in FIG. 5). The photosensitive assembly 20 includes a circuit board 23, a photosensitive chip 21, a camera lens holder 22, a filter 24 and the like. The photosensitive assembly 20 may be mounted on the second movable part 42 of the second driving part 40. Particularly, the bottom surface of the second movable part 42 may be supported on the top surface of the camera lens holder 22 of the photosensitive assembly 20. Particularly, in the second driving part 40, the second base part 41 and the second movable part 42 may be elastically connected through a suspension system. In this example, the suspension system allows the second movable part 42 to translate relative to the second base part 41 in the xoy plane. Alternatively, the suspension system may be a ball system, which has the advantage that: in the z direction, the second movable part 42 and the second base part 41 are in contact with each other through balls, and the second movable part 42 only moves in the xoy plane; the movement in the direction of the optical axis may be stopped by the balls located between the second movable part 42 and the second base part 41, so as to avoid affecting the focusing of the camera module.

Alternatively, in another example, the suspension system may include an elastic element (such as a spring), through which the fixing part and the movable part are connected, so that the movable part is allowed to translate relative to the base part in the xoy plane, however the movable part is prevented to translate relative to the base part outside the xoy plane. Compared with the ball system, the advantage of setting the elastic element is: the elastic element can provide an initial force between the base part and the movable part, and the initial force can cooperate with the driving force of the driving element so as to control the movement distance of the movable part or maintain its position, thus it is no need to set an additional driving element to provide conjugate driving force to control the position of the movable part. If a ball system is used, the movable part is free to move relative to the base part in the xoy direction when the driving element does not provide a driving force, so it is often necessary to provide at least one pair of mutually opposite driving forces to control the movable part to remain at its initial position.

Further, still referring to FIG. 5, in an example of the present application, anti-shake may be realized by driving the entire photosensitive assembly 20 to move. Meanwhile, the circuit board 23, the photosensitive chip 21, the camera lens holder 22, and the optical filter 24 are packaged as a whole; the circuit board 23, the camera lens holder 22, the optical filter 24 form a closed space, and the photosensitive chip 21 is accommodated in this closed space, thereby improving the closure of the photosensitive assembly 20 and ensuring that the imaging of the photosensitive chip 21 is not affected by dust during the production or use of the camera module.

In this example, still referring to FIG. 5, in one example of the present application, the back of the circuit board can be directly supported on the terminal device (i.e., the electronic device equipped with the camera module, e.g., a mobile phone). Particularly, the back of the circuit board 23 may be supported on the main board of the terminal device or other supporting component 90. Although in this example, the second movable part 42 is connected to the photosensitive assembly 20, and the second base part 41 is connected to the first driving part 30, it may be understood that the movement of the second movable part 42 and the second base part 41 is relative. In the anti-shake movement, the moving direction is opposite means that the moving direction of the movable part of the first driving part relative to its base part is opposite to the moving direction of the movable part of the second driving part relative to its base part.

Further, FIG. 6 shows a schematic cross-section view of a camera module according to another example of the present application. Referring to FIG. 6, in the present example, a rear housing 49 is added below the second driving part 40, and the rear housing 49 is connected to the second base part 41 of the second driving part 40 to form an accommodating cavity for accommodating both the second movable part 42 of the second driving part 40 and the photosensitive assembly 20. As shown in FIG. 6, there may be a gap 49a between the photosensitive assembly 20 and the bottom of the rear housing 49, i.e., the photosensitive assembly 20 is suspended and is only connected to the second movable part 42 of the second driving part 40. In this example, the rear housing 49 is directly supported on the terminal device. Since the rear housing 49 connects the terminal device, the second driving part 40 and the base part of the first driving part 30, during the anti-shake process, with the terminal device as a reference, the movable parts of the first driving part 30 and the second driving part 40 simultaneously drive the camera lens 10 and the photosensitive assembly 20 to move in opposite directions. Further, in this example, the second movable part 42 of the second driving part 40 is directly bonded to the upper end surface of the photosensitive assembly 20, so that the filter 24 may be separated from the external space, thereby avoiding the debris generated by friction or collision in the process of the movement of the second movable part 42 relative to the second base part 41 directly falling on the surface of the color filter 24.

Figure 7:
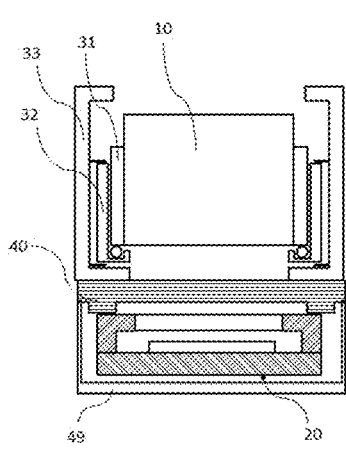
FIG. 7 shows a schematic cross-section view of a camera module according to yet another example of the present application.

FIG. 7 shows a schematic cross-section view of a camera module in another example of the present application. Referring to FIG. 7, in this example, the first driving part 30 is implemented to be suitable for driving the camera lens 10 to move in the direction of the optical axis to realize the focusing function and also to be suitable for driving the camera lens 10 to move in the xoy plane to realize the anti-shake function. Alternatively, the first driving part 30 includes at least two carriers, i.e., a first carrier 31 and a second carrier 32; the camera lens 10 is supported on the first carrier 31, a suspension system is provided between the first carrier 31 and the second carrier 32, and a suspension system is provided between the second carrier 32 and the housing 33 of the first driving part 30. In this example, the suspension system (i.e. the first suspension system) between the first carrier 31 and the second carrier 32 is set as a ball system, and the suspension system (i.e. the second suspension system) between the second carrier 32 and the housing 33 is a suspension system based on elastic elements, such as elastic sheet. In this example, the second suspension system is arranged outside the first suspension system, the first suspension system allows the camera lens 10 and the first carrier 31 to translate in the xoy plane to realize the anti-shake function, and the second suspension system allows the camera lens 10, the first carrier 31 and the second carrier 32 integrally move in the direction of the optical axis to realize the focusing function. Alternatively, in another example, the second suspension system can also be arranged inside the first suspension system. In another modified example, the second suspension system can also be arranged below the first suspension system. In this example, the suspension system refers to a system in which two components are movably connected, and the degree of freedom of relative movement (i.e., the direction of movement) of the two components is limited to a certain extent. These two movably connected components may be called base part and movable part respectively. Typically, a suspension system is used cooperatively with a driving element such as SMA element or coil-magnet combination. Particularly, the driving force is provided by a driving element, under the action of the driving force, the movable part moves relative to the base part in the moving direction defined by the suspension system.

Figure 8:
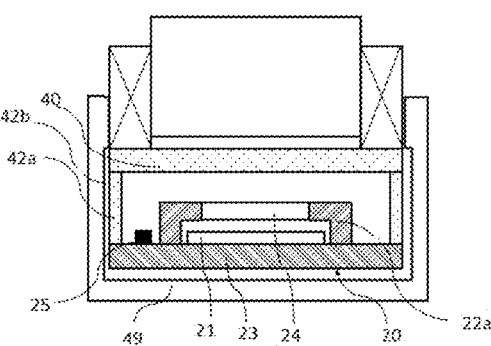
FIG. 8 shows a schematic cross-section view of a camera module according to still another example of the present application.

Further, FIG. 8 shows a schematic cross-section view of a camera module in yet another example of the present application. Referring to FIG. 8, in this example, the movable part of the second driving part 40 may be provided with an extension arm 42a extending downward; and the extension arm 42a is bonded to the circuit board 23 of the photosensitive assembly 20. An FPC board 42b may be provided on the extension arm 42a, and the FPC board 42b may be directly welded to the circuit board 23, so that the driving element mounted on the movable part is electrically connected to the circuit board 23. This example can prevent the glue from flowing onto the filter to affect the imaging when the photosensitive assembly 20 is bonded to the movable part. In addition, in this example, there is a gap between the upper end surface (i.e., the top end) of the photosensitive assembly 20 and the second driving part 40, which can prevent the color filter from being scratched or broken.

Figure 9A:
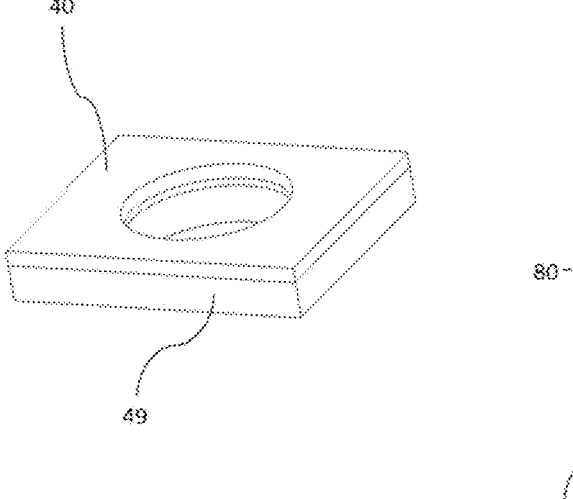
FIG. 9a shows a schematic perspective view of a second driving part according to an example of the present application.
Figure 9B:
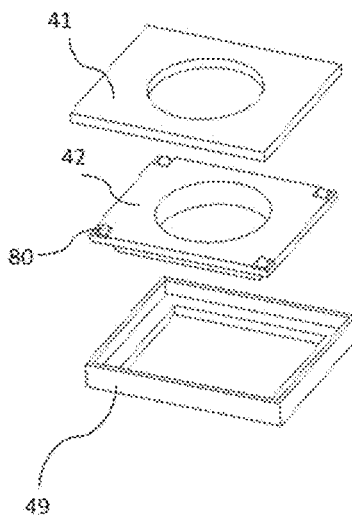
FIG. 9b shows a schematic exploded perspective view of a second driving part according to an example of the present application.

Further, FIG. 9a shows a schematic perspective view of the second driving part in one example of the present application, and FIG. 9b shows a schematic exploded perspective view of the second driving part in one example of the present application. Referring to FIG. 9a and FIG. 9b, in this example, the centers of the second movable part 42 and the second base part 41 of the second driving part 40 both have a light hole through which the light passing through the camera lens enters the photosensitive chip for imaging. In this example, there are preferably four balls 80, which are respectively arranged at the four corners of the second driving part 40 (referring to the four corners in a top view).

Figure 10A:
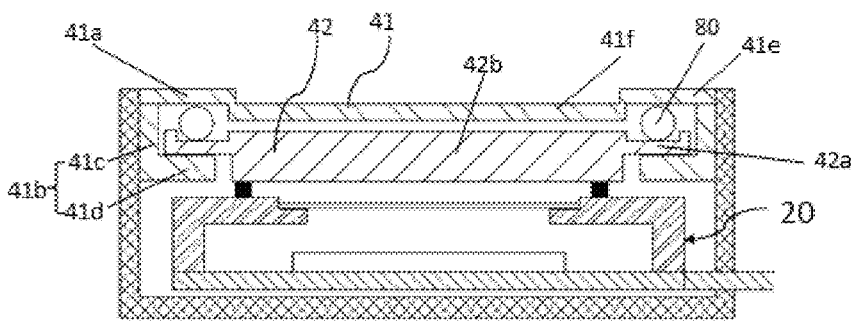
FIG. 10a shows a schematic cross-section view of a second driving part and a photosensitive assembly according to an example of the present application.

Further, FIG. 10a shows a schematic cross-section view of the second driving part and the photosensitive assembly according to an example of the present application. Referring to FIG. 10a, in this example, the second driving part 40 includes a second movable part 42 and a second base part 41, wherein the second base part 41 includes a base 41a and a cover 41b. The cover 41b includes a side wall 41c extending downward from the base 41a to surround the second movable part 42, and a supporting platform 41d extending horizontally inward from the side wall 41c. The top of the side wall 41c is connected to the base 41a, and the lower surface of the edge region 42a of the second movable part 42 may be supported on the upper surface of the supporting platform 41d. The balls 80 and the edge region 42a of the second movable part 42 are clamped between the base 41a and the supporting platform 41d of the cover 41b, ensuring that relative movement of the second movable part 42 and the second base part 41 will not occur in the direction of the optical axis (i.e., the z-axis direction). In this way, the second driving part 40 only allows the second movable part 42 to translate relative to the second base part 41 in the xoy plane. More particularly, at least one accommodating space is provided between the base 41a and the cover 41b, the accommodating space is provided with balls 80, and the second movable part 42 and the base 41a are respectively in close contact with the balls 80, thereby ensuring that the second movable part 42 and the second base part 41 will not move relative to each other in the direction of the optical axis. The second movable part 42 includes a main body portion 42b and an edge region 42a, and the thickness of the edge region 42a may be smaller than that of the main body portion 42b. The lower surface (also referred to as the lower end surface or the bottom surface) of the main body portion 42b may be lower than the lower surface (also referred to as the lower end surface or the bottom surface) of the cover 41*b*, thereby ensuring that after being attached to the second movable part 42, the photosensitive assembly 20 will not contact with the cover 41*b*, so as to prevent the photosensitive assembly 20 from bumping into or rubbing against the cover when it moves for anti-shake.

Further, still referring to FIG. 10*a*, in an example of the present application, the upper surface of the second base part 41 may have a stepped structure, and the stepped structure includes a first step surface 41*e* located on the outside of the upper surface and a second step surface 41*f* located on the inside of the upper surface. The height of the second step surface 41*f* is lower than that of the first step surface 41*e*, so as to provide a large axial (i.e., z-axis direction) movement space for focusing of the camera module. In this example, the first driving part may be mounted on the first step surface 41 *e* of the second base part 41 of the second driving part 40. The upper surface of the edge region 42*a* of the second movable part 42 can form a groove, which can accommodate the balls 80 and limit the movement of the balls 80 in the groove, and can also keep the debris generated by friction between the balls 80 and the second movable part 42 or the second base part 41 remaining in the groove. Moreover, since the balls 80 may be placed in the groove, the second movable part 42, the base 41*a* and the cover 41*b* of the second base part 41 may be assembled more conveniently. In another example, the boss located at the outside of the groove may be omitted, and this design can reduce the lateral dimension of the second driving part, which is beneficial to miniaturization of the camera module. Since the boss located at outside of the groove is canceled, the groove actually degenerates into a concave step, the outer step surface of the concave step is lower than the inner step surface, and the concave step together with the side wall of the cover and the base form an accommodating cavity for containing balls.

Further, in an example of the present application, a plurality of grooves may be provided on the edge region of the movable part, and the number of grooves may match the number of balls. Each of the balls is accommodated in a corresponding groove. The bottom surface of the groove may be a plane, which can ensure that the movable part will not tilt during translation, and at the same time, only a single layer of balls can realize the relative movement between the movable part and the base part on three axes in the xoy plane. Alternatively, a base groove may also be provided at a position of the base corresponding to the groove of the movable part. Under the condition that the diameter of a ball is constant, this design can reduce the thickness of the second driving part. Moreover, the bottom surface of the groove or the bottom surface of the concave step (referring to the outer step surface of the concave step) is a plane, which can allow the movable part to rotate relative to the base part in the xoy plane, i.e., to rotate around the z axis. The direction of rotation around the z-axis may be referred to as the Rz direction, and may also be referred to as the Rz-axis rotation. In this example, the photosensitive chip can move in three directions of x, y, and Rz to realize anti-shake, thus it has better anti-shake ability. Since the three moving directions of x, y, and Rz are all in the xoy plane, the relative movement on the three axes in the xoy plane mentioned above refers to the movement in the three directions of x, y, and Rz.

Figure 10B:
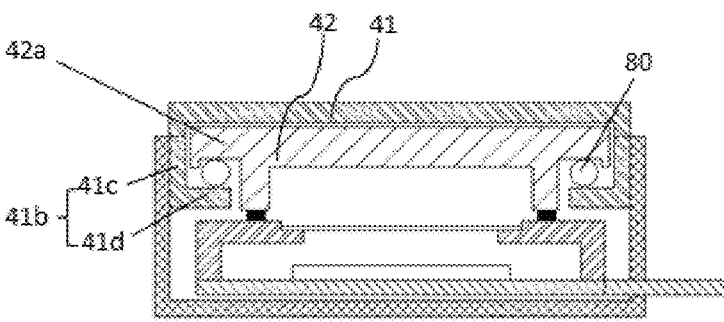
FIG. 10b shows a schematic cross-section view of a second driving part in which the balls are arranged on the lower side of the movable part according to a modified example of the present application.

FIG. 10*b* shows a schematic cross-section view of the second driving part in which the balls are arranged on the lower side of the movable part in a modified example of the present application. Referring to FIG. 10*b*, in this example, the balls 80 are located between the supporting platform 41*d* of the cover 41*b* and the second movable part 42. At a position corresponding to the balls 80, the edge region 42*a* of the second movable part 42 and/or the supporting platform 41*d* may be provided with a groove, and the groove bottom surface of the groove may be set as a plane, thereby allowing the second movable part 42 to move relative to the second base part 41 only in the xoy plane, and an inclination will not be generated when it moving in the xoy plane.

Figure 10C:
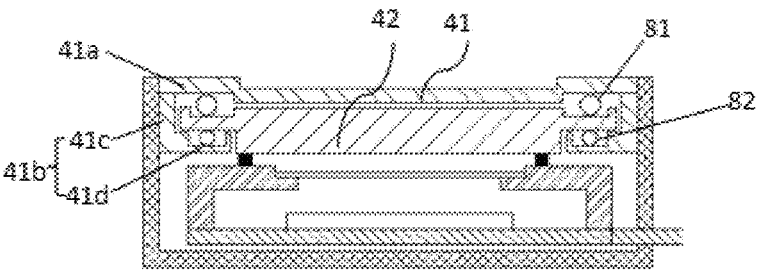
FIG. 10c shows a schematic cross-section view of a second driving part with two layers of balls according to a modified example of the present application.

FIG. 10*c* shows a schematic cross-section view of a second driving part with two layers of balls according to a modified example of the present application. In this example, two layers of balls 81 and 82 are provided. Particularly, a layer of balls 81 are arranged between the base 41*a* and the second movable part 42, and a layer of balls 82 are arranged between the second movable part 42 and the supporting platform 41*d* of the cover 41*b*. Compared with the example shown in FIG. 10*a*, in this example, since a layer of balls 82 are added between the second movable part 42 and the supporting platform 41*d*, when the second movable part 42 moves for anti-shake, it will not directly rub against the supporting platform 41*d*, thereby reducing the generation of debris. Moreover, by providing two layers of balls 81 and 82, the resistance of the second movable part 42 during movement may be reduced.

Figure 11A:
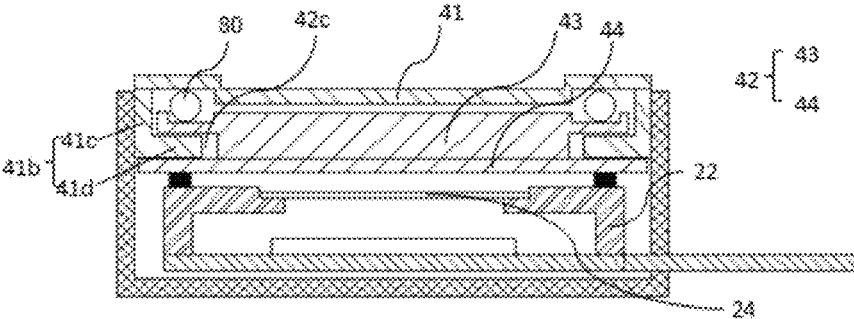
FIG. 11a shows a schematic cross-section view of a second driving part according to an example of the present application.

Further, FIG. 11*a* shows a schematic cross-section view of the second driving part in an example of the present application. Referring to FIG. 11*a*, in this example, the outer side surface of the second movable part 42 is provided with an inwardly recessed slot 42*c*, and the supporting platform 41*d* of the cover 41*b* of the second base part 41 fits into the slot 42*c*. In this solution, the lower end surface of the second driving part 40 may have a larger area, and when the camera lens holder 22 is attached to the second movable part 42, the glue may be arranged on the outer area of the camera lens holder 22, so that the glue may be away from the optical filter as far as possible, thereby reducing the risk that glue flows onto the optical filter 24, and at the same time completely avoiding the risk that the camera lens holder 22 rubs against the second base part 41 during the anti-shake movement. Further, in this example, the second movable part 42 may be a split type, e.g., the second movable part 42 includes a first member 43 of the movable part and a second member 44 of the second movable part; and the side surface of the second member 44 of the movable part and/or the first member 43 of the movable part is recessed inward to form the slot 42*c*. Further, FIG. 11*b* shows a schematic diagram of assembly of the second driving part according to an example of the present application. Referring to FIGS. 11*a* and 11*b*, in the assembly process of the second driving part 42, the first member 43 of the movable part, the second base part 41 and the balls 80 may be assembled first, and then the second member 44 of the movable part is attached to the lower end surface of the first member 43 of the movable part. With this design, there is no need to worry about the glue contacting with the base part at the time of attaching the camera lens holder; at the same time, the glue can also be placed near the edge of the camera lens holder (it is not necessary to avoid the base parts at the four corners), thereby avoiding the glue from polluting the color filter.

Alternatively, FIG. 11*c* shows a schematic cross-section view of the second driving part according to another example of the present application. Referring to FIG. 11*c*, in this example, the second movable part 42 may be integrally formed, i.e., the slot 42*c* is formed directly when the second movable part 42 is formed. And the cover 41*b* may be a split type. Referring to FIG. 11*b*, the cover 41*b* includes two split cover members 41*b*1 and 41*b*2, and the two split cover members 41*b*1 and 41*b*2 may be inserted laterally into the slot 42*c* of the second movable part 42 from the left and right sides respectively, so as to fix the axial (i.e., z-axis direction) positions of the second movable part 42 and the second base part 41 and finish the encapsulation of the second driving part 40.

Further, FIG. 12 shows a schematic cross-section view of the second driving part according to another example of the present application. Referring to FIG. 12, in this example, the outer side surface of the second movable part 42 is provided with an inwardly recessed slot 42*c*, and the supporting platform 41*d* and the balls 80 of the second base part 41 are both arranged in the slot.

Further, in an example of the present application, the movable part is bonded to the upper end surface of the camera lens holder of the photosensitive assembly, so as to realize the connection between the movable part and the photosensitive assembly. In a modified example, the movable part may also be configured to have an extension arm extending downward, and the circuit board of the photosensitive assembly is adhered through the extended arm, so as to realize the connection between the movable part and the photosensitive assembly. With reference to FIG. 8, in the solution in which the extension arm 42*a* of the movable part is bonded to the circuit board 23, alternatively, the camera lens holder may be selected as a small camera lens holder 22*a* with a lower height, and the small camera lens holder 22*a* is only used to install the photosensitive chip 24, the higher electronic components 25 such as capacitors are arranged on the outside of the photosensitive chip 21 and the small camera lens holder 22*a*. This solution can reduce the height of the camera lens holder, thereby reducing the back focus of the camera module, and reducing the overall height of the module. In this example, since at least part of the electronic components are arranged outside the camera lens holder, preferably, the outer side surface of the movable part of the second driving part 40 has the slot, so that the extension arm is arranged at the edge of the second driving part, and the extension arm is as far away from the electronic components as possible, thereby avoiding the influence of the glue on the electronic components.

FIG. 13*a* shows a schematic bottom view of the movable part of the second driving part according to an example of the present application. In this example, the glue 50 is arranged between the lower end surface of the second movable part 42 and the upper end surface of the camera lens holder of the photosensitive assembly. The arrangement of the glue 50 can avoid the four corner regions, so as to prevent the glue 50 from leaking into the gaps of the ball-containing structures located at the four corners and negatively affecting the movement of the anti-shake. At the same time, the edge of the second movable part 42 may be avoided from being too close to the optical filter, thereby reducing the risk that the glue contaminates the optical filter. FIG. 13*b* shows a schematic bottom view of the movable part of the second driving part according to another example of the present application. In this example, the glue 50 may be arranged into a closed circle along the edge region of the lower end surface of the second movable part 42. This design can increase the closure of the photosensitive assembly and prevent dust from falling onto the color filter.

It should be noted that the above examples may be combined with each other, for example, the slot design shown in FIG. 11*a*, FIG. 11*b* and FIG. 12 may be combined with the double-layer ball design. Particularly, the groove/concave step may be arranged on the supporting platform or on the movable part.

Figure 14:
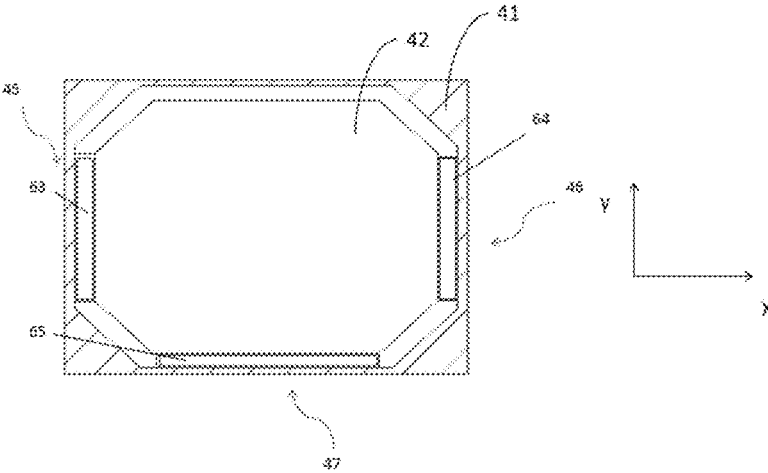
FIG. 14 shows the installation position of the driving element of a second driving part according to an example of the present application in a bottom view.
Figure 15A:
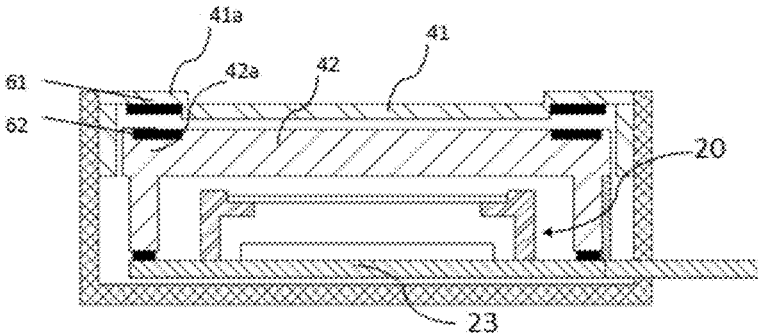
FIG. 15a shows a schematic cross-section view of a second driving part including a driving element according to an example of the present application.

Further, FIG. 14 shows the installation position of the driving element of the second driving part in a bottom view according to an example of the present application. FIG. 15*a* shows a schematic cross-section view of the second driving part including a driving element according to an example of the present application. In this example, the magnet 61 may be arranged on the edge region of the second base part 41, and the coil 62 may be arranged on the edge region 42*a* of the second movable part 42. The coil 62 can pass through the FPC board (flexible board) arranged on the second movable part 42, and the FPC board is welded and conductively connected to the circuit board 23 of the photosensitive assembly 20. Since the second movable part 42 and the photosensitive assembly 20 will move synchronously during the anti-shake process, welding the coil 62 to the circuit board 23 through the FPC board can ensure that the wire or the welding part does not move relative to each other during the movement process, thereby reducing the risk of electrical connection failure or poor contact at the welding position. In this example, the magnet may be arranged on the base 41*a* of the second base part 41.

Figure 15B:
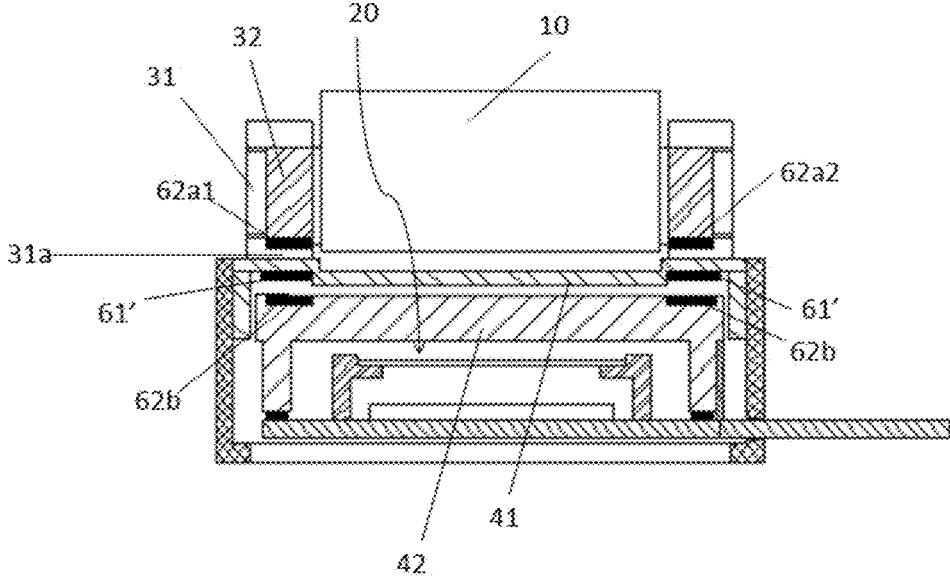
FIG. 15b shows a schematic cross-section view of a camera module according to an example of the present application.

Further, FIG. 15*b* shows a schematic cross-section view of a camera module according to an example of the present application. Referring to FIG. 14 and FIG. 15*b*, in one example of the present application, the driving elements of the first driving part 30 and the second driving part 40 are both coil-magnet combinations, and the first driving part 30 and the second driving part 40 may have a common magnet 61'. The common magnet 61' may be arranged on the first base part 31, or on the second base part 41 (as shown in FIG. 15*b*). For ease of description, the coil of the first driving part 30 is called the camera lens driving coil 62*a*, and the coil of the second driving part 40 is called the photosensitive assembly driving coil 62*b*. The camera lens driving coil 62*a* is mounted on the first movable part 32, and the photosensitive assembly driving coil 62*b* is mounted on the second movable part 42. In this example, the first driving part 30 drives the camera lens 10 to translate in the x-axis and y-axis directions through the electromagnetic induction of the camera lens driving coil 62*a* and the common magnet 61', and the second drive part 40 drives the photosensitive chip 20 to translate in the directions of the x-axis and the y-axis through the electromagnetic induction of the photosensitive assembly driving coil 62*b* and the common magnet 61'. Further, in this example, the common magnet 61' is arranged at the edge region of the second base part 41, and the camera lens driving coil 62*a* is arranged at the edge region of the second movable part 42. For convenience of description, in the second driving part 40, the common magnet 61' and the photosensitive assembly driving coil 62*b* are referred to as a coil-magnet combination. With reference to FIG. 14, in this example, in a top view, the coil-magnet combination includes a first coil-magnet pair 63, a second coil-magnet pair 64 and a third coil-magnet pair 65; wherein the first coil-magnet pair 63 and the second coil-magnet pair 64 are used to provide a driving force in the x-axis direction; the third coil-magnet pair 65 is used to provide a driving force in the y-axis direction. In a top view, the shape of the second driving part 40 is rectangular, and the first coil-magnet pair 61 and the second coil-magnet pair 62 are respectively arranged along the first side 48 and the second side 49 of the second driving part 40, and the first side 48 and the second side 49 do not intersect. The second coil-magnet pair 63 is arranged along the third side 47 of the second driving part

40, and the third side 47 intersects with both the first side 48 and the second side 49. Correspondingly, in this example, the camera lens driving coil includes a first camera lens driving coil 62a1, a second camera lens driving coil 62a2 and the third camera lens driving coil (not shown in FIG. 15b, its position in a top view can refer to the position of the third coil-magnet pair 65 in FIG. 14) respectively arranged above the first coil-magnet pair 63, the second coil-magnet pair 64 and the third coil-magnet pair 65. The common magnet 61' of the first camera lens driving coil 62a1 and the first coil-magnet pair 63, and the common magnet 61' of the second camera lens driving coil 62a2 and the second coil-magnet pair 64 are used for providing a driving force in the x-axis direction, and the common magnet 61' of the third camera lens driving coil and the third coil-magnet pair 65 is used for providing a driving force in the y-axis direction.

Figure 15C:
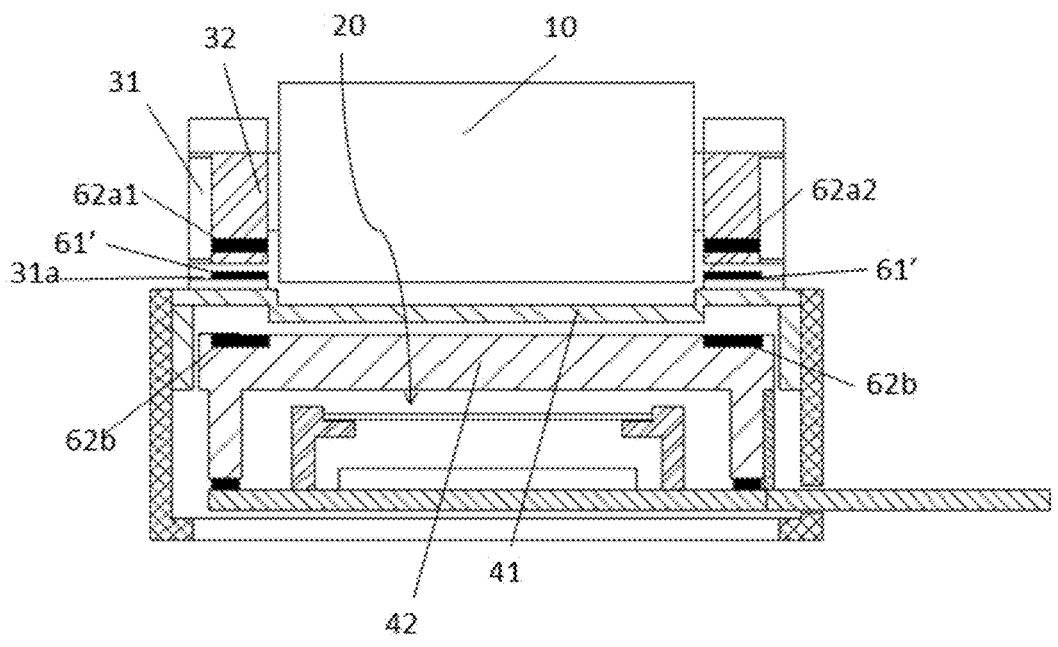
FIG. 15c shows a schematic cross-section view of a camera module according to yet another example of the present application.

Further, FIG. 15c shows a schematic cross-section view of a camera module according to another example of the present application. Refer to FIG. 14 and FIG. 15c. In this example, the first base part 31 includes a motor foundation 31a located below the first movable part 32, and the motor foundation 31a has a light hole. In this example, the common magnet 61' is mounted on the edge region of the motor foundation 31a; the first movable part 32 is cylindrical, and the camera lens driving coil is mounted on the inner side surface of the first movable part 32, the camera lens driving coil 62a (for example, the first camera lens driving coil 62a1 and the second camera lens driving coil 62a2) is mounted on the bottom of the first movable part 32. In this example, the magnet-coil pair formed by the common magnet 61' and the camera lens driving coil 62a includes a first coil-magnet pair 63, a second coil-magnet pair 64, and a third coil-magnet pair 65 (referring to FIG. 14); particularly, the first coil-magnet pair 63 and the second coil-magnet pair 64 are used to provide a driving force in the x-axis direction; the third coil-magnet pair 65 is used to provide a driving force in the y-axis direction; and in a top view, the outer contour of the first driving part is rectangular, and the first coil-magnet pair 63 and the second coil-magnet pair 64 are respectively arranged along the first side and the second side of the first driving part 30, the first side and the second side do not intersect with each other; the third coil magnet 65 is arranged along the third side of the first driving part 30, and the third side intersects with both the first side and the second side. The photosensitive assembly driving coil 62b includes a first photosensitive assembly driving coil, a second photosensitive assembly driving coil, and a third photosensitive assembly driving coil respectively arranged under the first coil-magnet pair 63, the second coil-magnet pair 64, and the third coil-magnet pair 65. The common magnet of the first photosensitive assembly driving coil and the first coil-magnet pair, and the common magnet of the second photosensitive assembly driving coil and the second coil-magnet pair are used to provide a driving force of the photosensitive assembly 20 in the x-axis direction, and the common magnet of the third photosensitive assembly driving coil and the third coil-magnet pair is used to provide a driving force of the photosensitive assembly 20 in the y-axis direction.

Further, in a modified example of the present application, in the first driving part, one of the first camera lens driving coil and the second camera lens driving coil may be omitted, i.e., the first base part of the first driving part can only be mounted a first camera lens driving coil or only a second camera lens driving coil to provide a driving force in the x-axis direction. In this example, the camera lens does not need the degree of freedom of movement around the z-axis, the movement in the x-axis and the y-axis may be realized by only remaining the first camera lens driving coil and the third camera lens driving coil. Particularly, in this example, the magnet-coil pair formed by the common magnet and the photosensitive assembly driving coil includes: a first coil-magnet pair, a second coil-magnet pair, and a third coil-magnet pair; wherein the first coil-magnet pair and the second coil-magnet pair are used to provide a driving force in the x-axis direction; the third coil-magnet pair is used to provide a driving force in the y-axis direction; and in a top view, the outer contour of the second driving part is rectangular, the first coil-magnet pair and the second coil-magnet pair are respectively arranged along the first side and the second side of the first driving part, and the first side and the second side do not intersect; and the third coil-magnet pair is arranged along a third side of the second driving part, and the third side intersects with both the first side and the second side. The camera lens driving coil includes an x-axis camera lens driving coil and a y-axis camera lens driving coil, the x-axis camera lens driving coil may be located directly above the first coil-magnet pair, and the y-axis camera lens driving coil may be located directly above the third coil-magnet pair. And the camera lens driving coil may not be arranged directly above the second coil-magnet pair. This design can reduce the number of camera lens driving coils of the first movable part, and will help to reduce the difficulty of realizing the electrical connection between the coil of the first movable part and the circuit board of the photosensitive assembly, thereby reducing the process cost and also facilitating to improve production yield. At the same time, in this example, the relative rotation between the photosensitive chip and the electronic terminal device (such as a mobile phone) on the Rz degree of freedom still can be realized by the Rz degree of freedom of movement (i.e., the degree of freedom of rotation around the z-axis) of the second movable part.

Figure 15D:
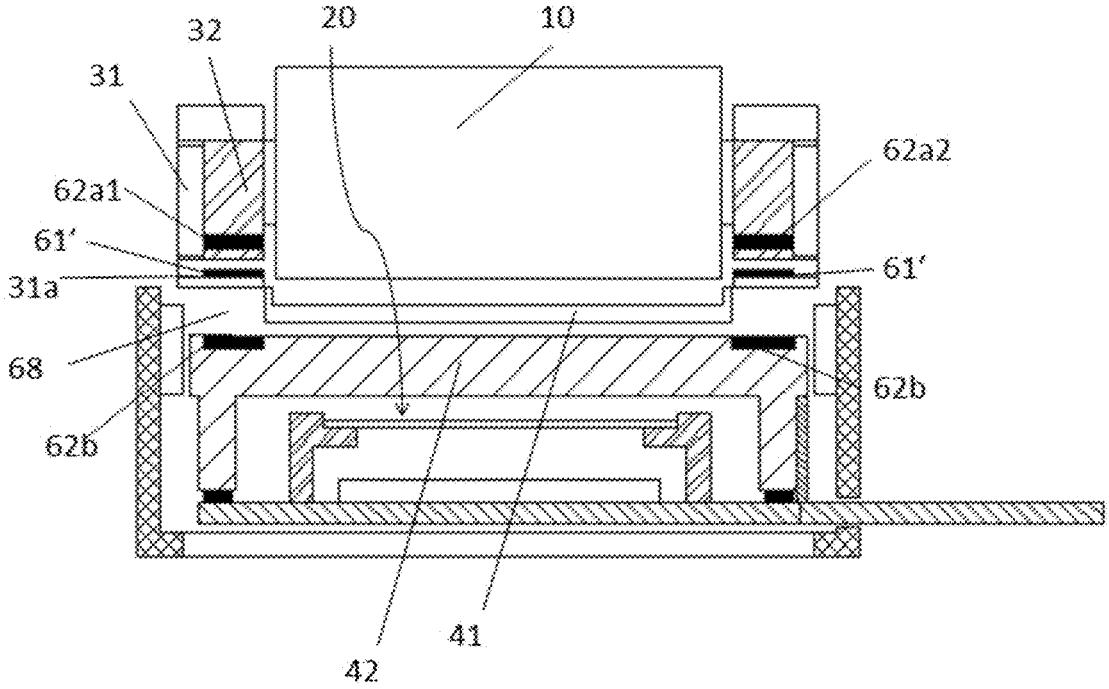
FIG. 15d shows a schematic cross-section view of a camera module according to a modified example of the present application.

Furthermore, FIG. 15d shows a schematic cross-section view of a camera module according to a modified example of the present application. This example may be considered as a modified example of FIG. 15c. Referring to FIG. 15d, in this example, the common magnet is mounted on the bottom of the first base part (for example, being mounted on the motor foundation). Under this design, the distance between the camera lens driving coil 62a and the common magnet 61' in the first driving part is small, which can increase the driving force of the coil-magnet pair of the first driving part. However, the distance between the common magnet 61' and the coil of the second driving part (photosensitive assembly driving coil 62b) may be relatively large. Therefore, in this example, the notch 68 or the through hole 69 may be arranged at a position of the second base part 41 corresponding to the common magnet 61' (i.e., in a top view, the photosensitive assembly driving coil is not blocked by the second base part through the hollow structure), so as to avoid reducing the electromagnetic force between the common magnet 61' and the photosensitive assembly driving coil 62b due to the blocking of the second base part 41. In this example, the notch 68 or the through hole 69 refers to a hollow structure formed by hollowing out a part of the block on the second base part. Further, FIG. 15e shows a schematic perspective view of the second driving part with a notch in the second base part, and FIG. 15f shows a schematic exploded perspective view of the second driving part with a notch in the second base part. Referring to FIG. 15e and FIG. 15f, it may be seen that the notch 68 refers to a hollow structure that at least one side is not surrounded by a non-hollow block of the second base part. For example, when the coil is arranged close to the outer side surface of the second driving part, the edge block of the second base part corresponding to the coil may be hollowed out to form the gap. The photosensitive assembly driving coil may be any one or more of the first photosensitive assembly driving coil, the second photosensitive assembly driving coil, and the third photosensitive assembly driving coil. FIG. 15g shows a schematic perspective view of the second driving part with the second base part having a through hole, and FIG. 15h shows a schematic exploded perspective view of the second driving part with the second base part having a through hole. Referring to FIG. 15g and FIG. 15h, it may be seen that the through hole 69 refers to a hollow structure surrounded by non-hollow blocks of the second base part 41. In this example, the base 41b of the second base part 41 is located between the motor foundation 31a and the second movable part 42, thus the notch 68 or the through hole 69 is located at the base 41b of the second base part 41. It should be noted that, the through hole 69 herein refers to a through hole in the edge region for avoiding the magnetic field of the magnet, and is not a light hole located in the central.

In the above examples, the design idea that a magnet is shared by the first driving part and the second driving part is adopted, and this design idea can reduce the volume occupied by installing the magnet of the first base part or the second base part, thereby facilitating to reduce the thickness of the foundation of the first base part (such as the motor foundation) or the base of the second base (the base of the second base is usually located between the first base part and the second movable part), thereby facilitating to reduce in the height direction of the camera module.

In the above example, the bottom surface of the first base part may be bonded to the top surface of the second base part through the first adhesive material, so as to bond a first combinational body formed by the first driving part and the camera lens assembly and a second combinational body formed by the second driving part and the photosensitive assembly together to form a complete camera module. In a top view, the first adhesive material may be arranged outside the common magnet of the first base part or the second base part. This design can prevent the adhesive force between the first base part and the second base part from being negatively affected. This is because the type of glue is often selected according to the materials of the first base part and the second base part, so the adhesive force between the glue and the magnet is often weaker than that between the glue and the first base part and the second base part. Therefore, in this example, the location of the glue avoids the common magnet of the first base part or the second base part, thereby facilitating to improve the structural strength and reliability of the camera module.

Further, according to an example of the present application, in the camera module, the photosensitive assembly includes: a circuit board, a photosensitive chip mounted on the surface of the circuit board, a camera lens holder mounted on the surface of the circuit board and surrounding around the photosensitive chip, a filter mounted on the camera lens holder, and an electronic component mounted on the surface of the circuit board and located outside the camera lens holder. In the second driving part, the second movable part may have a rigid extension arm extending downward, the extension arm is bonded to the circuit board of the photosensitive assembly, and the extension arm surrounds around the camera lens holder, and the electronic component is located in a gap between the inner side surface of the extension arm and the outer side surface of the camera lens holder; the photosensitive assembly driving coil is electrically connected to the circuit board through the FPC, and the FPC is attached to the side surface of the extension arm, and the FPC is directly welded to the circuit board. In this example, the rigid extension arm surrounding the camera lens holder can protect the electronic components. The electronic components may be, for example, resistors, capacitors, etc., which together with the circuits in the circuit board can form various functional circuits required by the camera module.

Figure 16A:
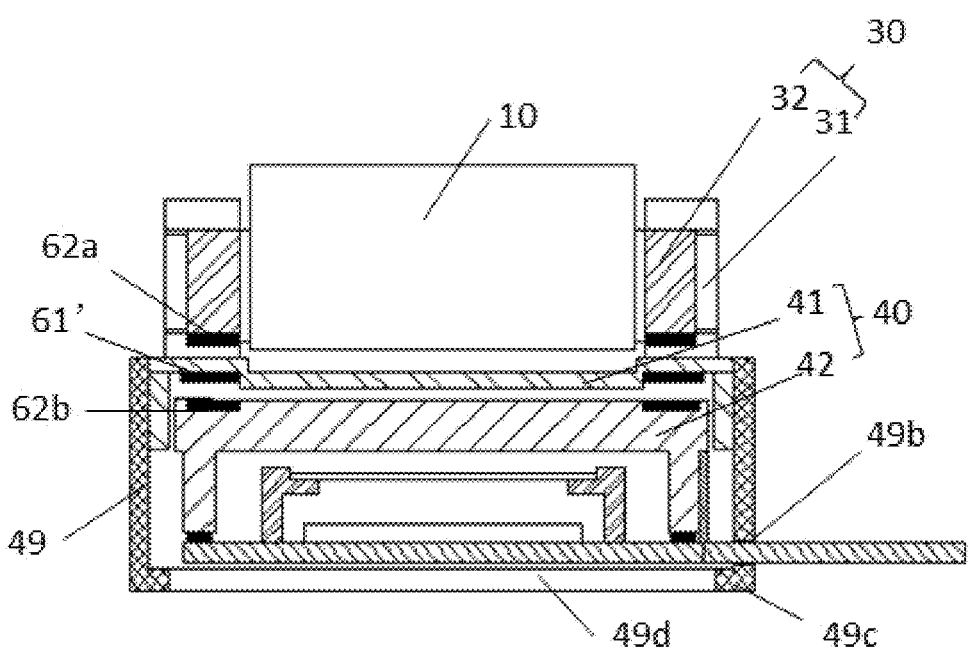
FIG. 16*a* shows a schematic cross-section view of a camera module according to an example of the present application.

Further, FIG. 16a shows a schematic cross-section view of a camera module according to an example of the present application. Referring to FIG. 16a, in this example, the side wall of the rear housing 49 may have a first through hole 49b, so that the flexible printed circuit (FPC) of the circuit board 23 can pass through it, so as to realize electrical connection to the main board or other components of the terminal device. The center of the bottom plate 49c of the rear housing 49 may have a second through hole 49d, so as to facilitate the assembly of the camera module. The process of assembling the camera module includes: firstly installing the camera lens 10 on the first driving part 30, then attaching the second driving part 40 to the bottom of the first driving part 30, and finally passing the photosensitive assembly 20 through the second through hole 49d at the bottom of the rear housing 49 and attaching upwardly to the second movable part 42 of the second driving part 40.

Figure 16B:
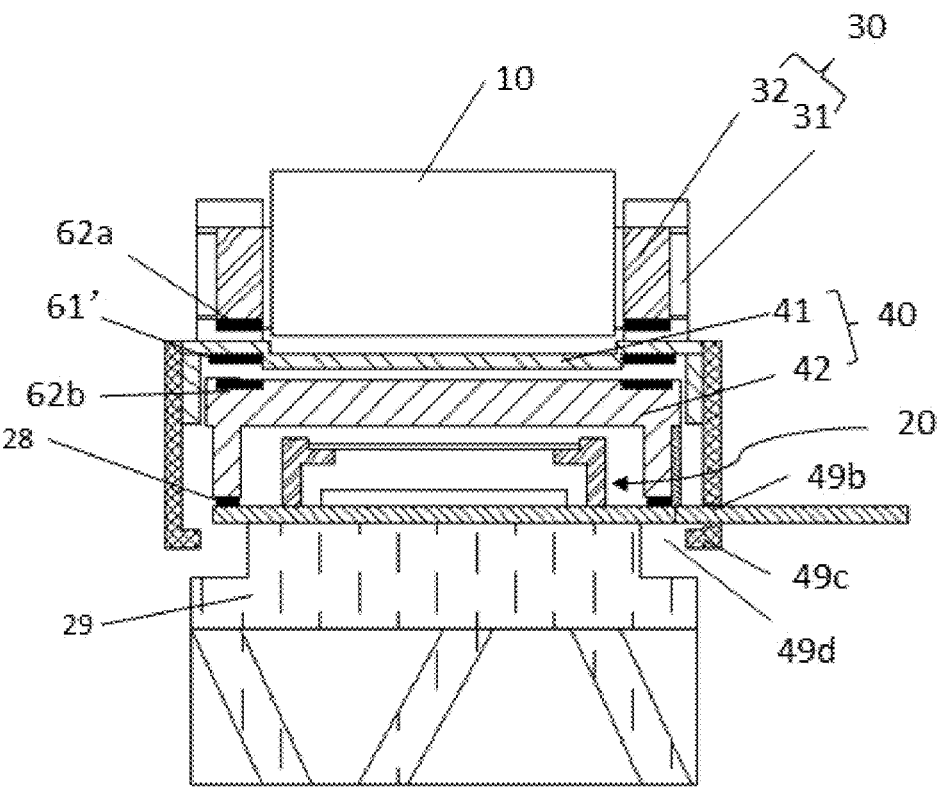
FIG. 16*b* shows a schematic diagram of the assembly method of the camera module according to an example of the present application.

FIG. 16b shows a schematic diagram of the assembly method of the camera module according to an example of the present application. In this example, alternatively, the photosensitive assembly 20 may be placed on the adjustment device 29, and the second through hole 49d at the bottom of the rear housing 49 allows the adjustment device 29 to determine the preferred position and posture of the photosensitive assembly 20 by active calibration process, and then bonding the photosensitive assembly 20 to the second movable part 42 of the second driving part 40 by glue 28.

Figure 16C:
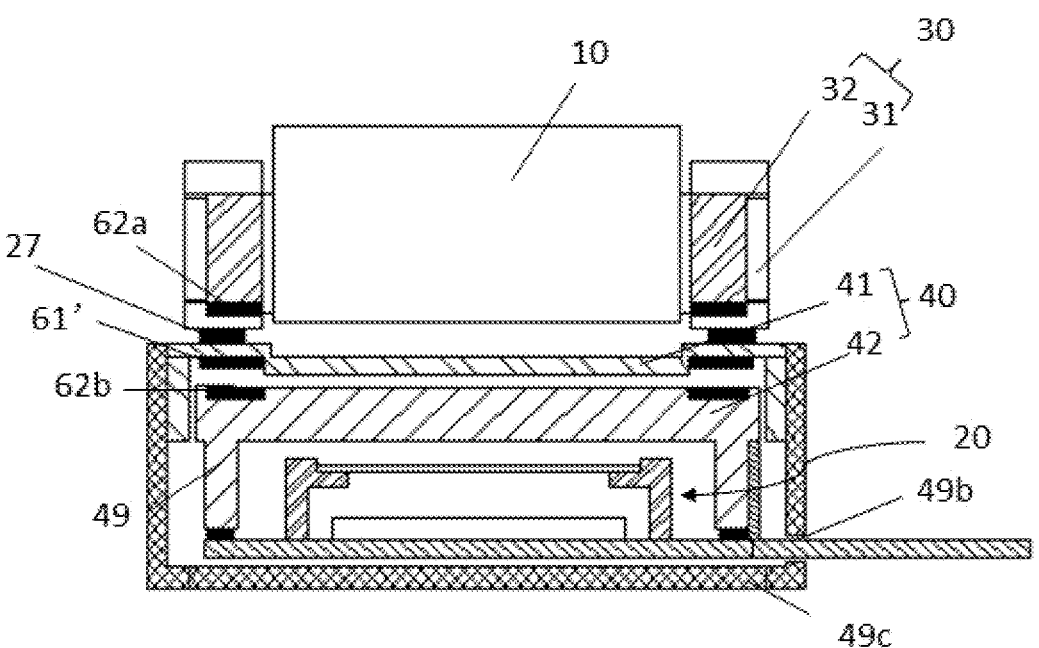
FIG. 16*c* shows a schematic cross-section view of a camera module according to another example of the present application.

FIG. 16c shows a schematic cross-section view of a camera module according to another example of the present application. Referring to FIG. 16c, in this example, the bottom of the rear housing 49 is a complete bottom plate 49c, i.e., there is no second through hole on the bottom plate 49c; at the time of assembling, firstly the second driving part 40 and the photosensitive assembly 20 may be attached together to form a first combinational body, the first driving part 30 and the camera lens 10 are assembled together to form a second combinational body, and then the relative positions of the first combinational body and the second combinational body are determined by active calibration process (active calibration comprises adjustment of position and posture), and finally the first driving part 30 is bonded to the second driving part 40 according to the relative positions determined by active calibration, wherein the glue 27 for bonding the first combinational body and the second combinational body may be arranged between the bottom surface of the first driving part 30 and the top surface of the second driving part 40.

Figure 17:
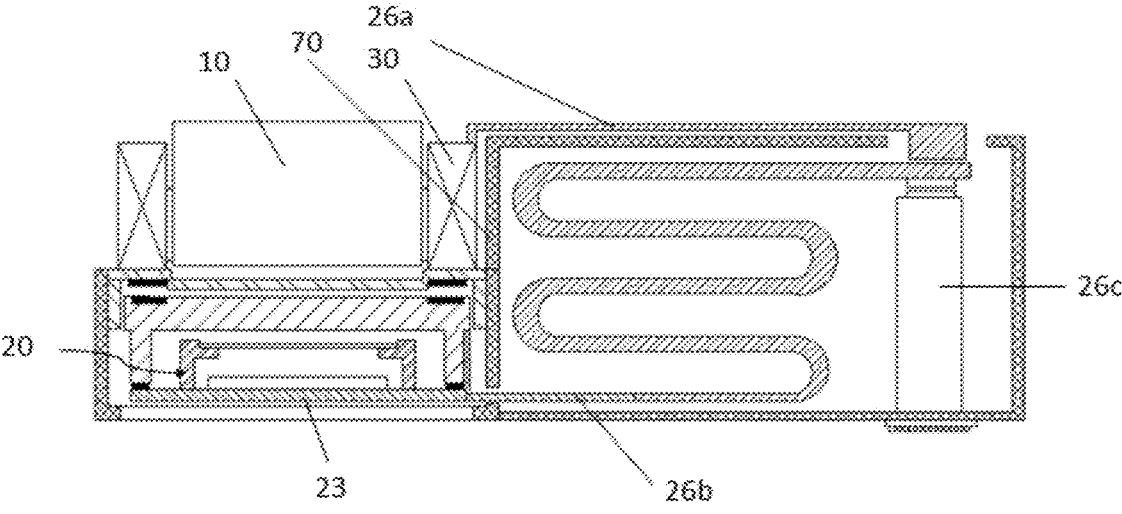
FIG. 17 shows the layout of a camera module and its connection belt according to one example of the present application.

Further, FIG. 17 shows the layout of the camera module and its connection belts according to one example of the present application. Referring to FIG. 17, in this example, the camera module includes a first connection belt 26a and a second connection belt 26b. The first connection belt 26a is arranged on the top region of the first driving part 30 and is electrically connected to the first driving part 30, and the second connection belt 26b is connected to the circuit board 23 of the photosensitive assembly 20. Particularly, the second connection belt 26b may be provided with multiple bends to form a curved overlapped structure, so as to buffer the stress caused by the movement of the photosensitive assembly 20. A connector may be provided at the end of the second connection belt 26*b*, and the connector may be fixed by pressing and electrically connected to the transfer post, and then connected to the main board (or other components) of the terminal device through the transfer post 26*c*. Similarly, the end of the first connection belt 26*a* can also be connected to a connector, which may be fixed by pressing and electrically connected to the transfer post 26*c*, then conductively connecting to the main board (or other components) of the terminal device through the transfer post 26*c*. In the solution of this example, the conduction circuit of the first driving part 30 may be separated from the photosensitive assembly 20, and is not affected by the movement of the photosensitive assembly 20. The second connection belt 26*b* and the transfer post 26*c* may be accommodated in the second housing 70, the first connection belt 26*a* is located outside the second housing 70, and the top of the second housing 70 can have a third through hole 70*a*, so that the connector of the first connection belt 26*a* may protrude into and be electrically connected to the second connection belt 26*b* or the transfer post 26*c*.

In the above example, the first driving part and the second driving part may constitute a driving structure for the optical actuator; in the driving structure, the first driving part is adapted to mounting the camera lens, and the second driving part is adapted to mounting the photosensitive assembly, the camera lens and the photosensitive chip are configured to be driven simultaneously and move in opposite directions. For example, if the camera lens is driven to move in the positive direction of the x-axis, the photosensitive chip is driven to move in the negative direction of the x-axis; if the camera lens is driven to move in the positive direction of the y-axis, the photosensitive chip is driven to move in the negative direction of the y-axis; alternatively, if the camera lens is driven to move in the x-axis and y-axis, and the photosensitive chip is driven to move in a direction opposite to that of the camera lens movement on the x-axis and y-axis; in other words, when it is necessary to move on the x-axis and y-axis at the same time, in the xoy plane, the direction of the displacement vector of the camera lens and that of the displacement vector of the photosensitive chip are opposite. In this example, the camera lens and the photosensitive chip are configured to move simultaneously, and the camera lens and the photosensitive chip move in opposite directions, which can achieve faster response and better anti-shake effect. In addition, usually the anti-shake angle range of the camera module is limited by the suspension system and the driving system, and it is impossible to achieve a relatively large compensation angle range. In this example, compensation for shaking at large angle range is realized by driving the camera lens and the photosensitive chip to move simultaneously in opposite directions. In addition, compared with the solution of only driving the camera lens to move, in this example there is a larger relative movement stroke between the camera lens and the photosensitive chip (for ease of description, this relative movement stroke is referred to as the anti-shake stroke for short) by driving the camera lens and the photosensitive chip to move simultaneously in opposite directions, thereby obtaining a better compensation effect. In particular, due to the increase of the anti-shake stroke, this example also has a better compensation effect on the tilt shake of the camera module. Further, in this example, the movement direction of the anti-shake movement may be limited in the xoy plane, without tilting the optical axis of the camera lens or the photosensitive chip, thereby avoiding the blurring problem caused by the anti-shake movement.

Further, in the camera module, the circuit board of the photosensitive assembly usually includes a rigid circuit board main body and a flexible connection belt, wherein one end of the flexible connection belt is connected to the circuit board main body, and the other end is conductively connected to the main board or other components of an electronic device through a connector. In a conventional example, the flexible connection belt of the photosensitive assembly is usually led out from the side surface of the circuit board main body, and the surface of the flexible connection belt is roughly parallel to that of the circuit board main body. In this layout, the flexible connection belt will generate greater resistance to the movement of the circuit board main body, which may increase the force required to drive the circuit board main body, resulting in insufficient stroke for anti-shake compensation and decreased response speed. Moreover, the resistance caused by the connection belt is irregular, which makes it difficult for the second driving part to compensate for the resistance, and it is possible to result in a decrease in the accuracy of the anti-shake compensation. Therefore, in this example, a suspended circuit board is provided as a circuit board of the photosensitive assembly adapted to the second driving part, and this design method will help to overcome the above-mentioned defects caused by the connection belt.

Figure 18:
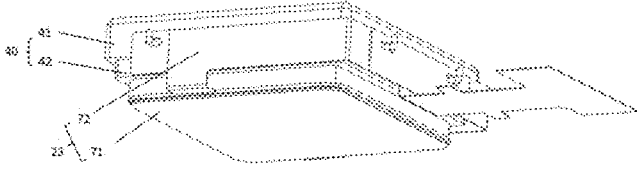
FIG. 18 shows a schematic perspective view of the assembled second driving part and photosensitive assembly according to one example of the present application.

FIG. 18 shows a schematic perspective view after assembling of the second driving part and a photosensitive assembly according to an example of the present application. FIG. 19 shows a schematic exploded view of the second driving part and the photosensitive assembly in one example of the present application. FIG. 20 shows a schematic perspective view of a photosensitive assembly and a suspended circuit board used in one example of the present application. Referring to FIG. 18, FIG. 19 and FIG. 20, in the camera module of the example, the photosensitive assembly 20 is connected to the second movable part 42 of the second driving part 40, so the circuit board main body 71 may move in the xoy plane when it is driven by the second movable part 42. The circuit board 23 in this example is designed as a suspended structure. Particularly, the circuit board 23 includes a rigid circuit board main body 71 and a flexible connection belt 72, wherein the connection belt 72 includes a third connection belt 72*a* and a fourth connection belt 72*b*, the third connection belt 72*a* and the fourth connection belt 72*b* may be led out respectively from two opposite side surfaces of the circuit board main body 71 (for convenience of description, these two opposite side surfaces may be referred to as the first side surface 74*a* and the second side surface 74*b*) and they are bent upward. The bent third connection belt 72*a* and the fourth connection belt 72*b* can respectively form a suspension part 75. The suspension part 75 may be connected to the base part of the second driving part 40 (or the first driving part 30), so as to form a suspension structure. The suspension structure allows the base to suspend the circuit board main body 71 and the various components mounted on its surface (i.e., suspending the photosensitive assembly 20) through the bent part 73 of the flexible connection belt 72. Particularly, in one example, the suspension part 75 may have a through hole (suspension hole 75*a*), and the second base part 41 of the second driving part 40 may have a corresponding hook 75*b*, and the hook 75*b* hooks the through hole of the suspension part 75 to connect the suspension part 75. In the prior art, the connection belt and the circuit board main body are usually on the same plane, and at this time the deflection of the connection belt relative to the circuit board main body on the same plane will generate relatively large resistance. However, in this example, the connection position between the connection belt 72 and the circuit board main body 71 is provided with a bent part 73 formed by bending upward, at this time the resistance generated by the connection belt 72 relative to the circuit board main body 71 in the xoy plane (it can be considered as a horizontal plane) is relatively small.

Further, in an example of the present application, the third connection belt 72a and the fourth connection belt 72b may extend along the periphery of the circuit board main body 71 and the photosensitive assembly 20, so that the connection belt 72 surrounds the photosensitive assembly on at least three sides. Additionally, the third connection belt 72a and the fourth connection belt 72b are conductively connected to each other. Particularly, the photosensitive assembly 20 has a first side surface 74a and a second side surface 74b having a position corresponding to the circuit board main body 71. The first side surface 74a and the second side surface 74b are opposite to each other (i.e., they do not intersect each other), and the third side surface 74c of the photosensitive assembly 20 intersects with both the first side surface 74a and the second side surface 74b. The connection belt 72 can surround the first side surface 74a, the second side surface 74b and the third side surface 74c of the photosensitive assembly 20. The third connection belt 72a is led out from the first side surface 74a of the circuit board main body 71 and is bent upward to form the bent part 73, and then extends along the first side surface 74a of the photosensitive assembly 20, and is bent upward in the horizontal direction at the corner and continues to extend along the third side surface 74c. The fourth connection belt 72b is led out from the second side surface 74b of the circuit board main body 71 and is bent upward to form another bent part 73, and then extends along the second side surface 74b of the photosensitive assembly 20, and is bent horizontally at the corner and continues to extend along the third side surface 74c. The third connection belt 72a and the fourth connection belt 72b may be joined at the third side surface 74c and be conductively connected to each other, so as to form a complete connection belt 72. The three connection belt segments located at the first side surface 74a, the second side surface 74b and the third side surface 74c may respectively have at least one suspension part 75, and each of the suspension parts 75 has at least one through hole so as to be connected to the second base part 41 of the second driving part 40 (or the first driving part 30). In this example, the suspension part 75 can suspend the circuit board main body 71 through the bent parts 73 located on opposite sides of the circuit board main body 71, so that when the circuit board main body 71 is driven by the second driving part 40, the bent part 73 and the connection belt 72 may be bent and deformed to satisfy the movement stroke of the circuit board main body 71.

Further, in one example of the present application, the suspension parts 73 of the three connection belt segments located on the first side surface 74a, the second side surface 74b and the third side surface 74c may all be reinforced by a rigid substrate. For example, a rigid substrate may be attached to a part of the flexible connection belt to form a suspension part 73. The other areas of the flexible connection belt are still in a flexible state, so as to be able to undergo bending deformation to meet the movement stroke of the circuit board main body 71.

Further, in an example of the present application, the connection belt segment located on the third side surface 74c may have a rigid suspension part 75c, and a fifth connection belt 76 may be led out from the suspension part 75c, the fifth connection belt 76 may be used to connect to the main board of an electronic device such as a mobile phone.

Furthermore, in another example of the present application, the suspension part may also be connected to an outer bracket (not shown in the figure), and the outer bracket is directly or indirectly fixed to the base part of the second driving part together. In this application, the suspension part may be fixed together with the base part of the second driving part through other intermediaries. Particularly, the intermediary may be directly or indirectly fixed to the base part of the second driving part. The intermediary has a hook for hooking the suspension part, or the intermediary is bonded to the suspension part. The intermediary may be the outer bracket, or the base part of the first driving part, or other intermediaries.

Further, in another example of the present application, the suspension part may not have the through hole. In this example, the suspension part may be fixed together with the base part of the second driving part (or with the base part of the first driving part or the outer bracket) by bonding. Further, in another example of the present application, the third connection belt and the fourth connection belt may be a rigid-flex board, wherein a part for forming the suspension part may be a hard board, and both a part for connecting the suspension part and a bent part formed by bending upward may be soft board. Since the suspension part is directly formed by hard board, the suspension part may not be reinforced by attaching a rigid substrate in this example.

Further, in an example of the present application, the circuit board main body, the third connection belt and the fourth connection belt may be formed by a complete rigid-flex board.

Further, still referring to FIG. 18, FIG. 19 and FIG. 20, in an example of the present application, the circuit board may also have a fixing part 76a for fixing the fifth connection belt 76, this design can avoid the circuit board main body 71, the third connection belt 72a and the fourth connection belt 72b being affected by external factors.

Further, FIG. 21a shows a schematic front view of a suspended circuit board according to an example of the present application after being expanded; FIG. 21b shows a schematic back view of a suspended circuit board according to an example of the present application after being expanded. Referring to FIG. 21a and FIG. 21b, in this example, the circuit board 23 may be composed of a rigid-flex board. Particularly, the segments of the third connection belt 72a and the fourth connection belt 72b located on the third side surface 74c may be fastened with each other through connectors 78, 79 (referring to FIG. 20), so that the third connection belt 72a is connected and fixed to the fourth connection belt 72b to further realize electrical connection. Both the third connection belt 72a and the fourth connection belt 72b are provided with circuits, so as to lead out the circuits in the circuit board main body 71, and then connect to the external circuit through the fifth connection belt 76 and its connector 77. Since the third connection belt 72a and the fourth connection belt 72b can each lead out a part of the circuit through the corresponding bent part 73 formed by bending upward, the circuit of each bent part 73 that need to be led out may be reduced; in this way, the width of each bent part 73 may be reduced, thereby further reducing the resistance formed by the flexible connection belt 72 to the movement of the circuit board main body 71, thereby reducing the driving force required to be provided by the second driving portion 40. It should be noted that in other examples of the present application, the circuit of the circuit board main body can also only pass through one of the bending parts (for example, a bending part of the third connection belt formed by bending upward, or a bending part of the fourth connection belt formed by bending upward) to be led out.

It should be noted that the suspension system of the second driving part according to the present application is not limited to the above-mentioned examples. For example, in some other examples of the present application, the second driving part can realize multi-axis adjustment suspension system based on a multi-layer frame and a ball structure. This type of suspension systems and the corresponding camera modules will be described in detail below with reference to FIGS. 22-33.

Figure 22:
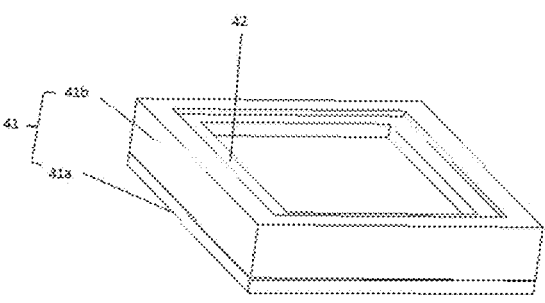
FIG. 22 shows a schematic cross-section view of a camera module according to yet another example of the present application.

FIG. 22 shows a schematic perspective view of the second driving part according to an example of the present application. Referring to FIG. 22, in an example of the present application, the second driving part 40 includes a second movable part 42 and a second base part 41. The second base part 41 includes a base part substrate 41a and a cover 41b. An edge region of the second movable part 42 is arranged between the base part substrate 41a and the cover 41b.

Figure 23:
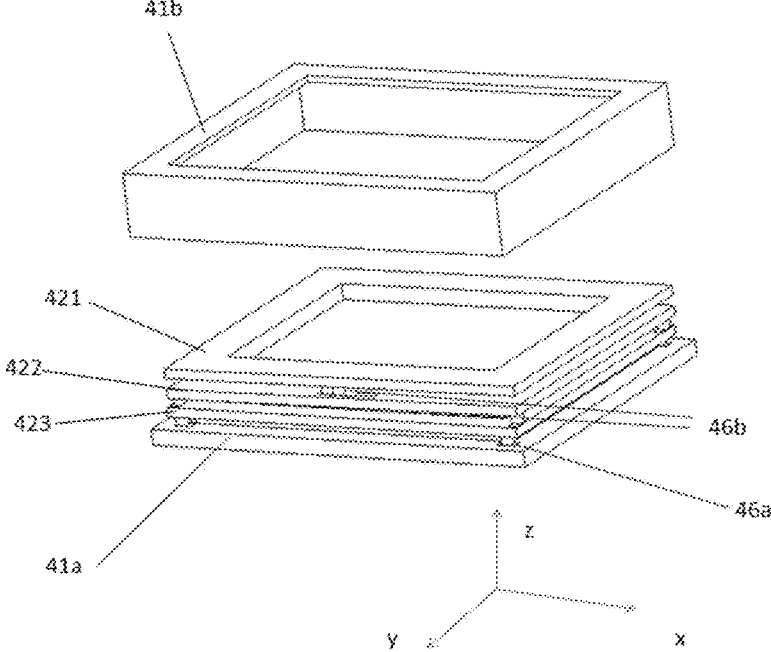
FIG. 23 shows a schematic exploded perspective view of a second driving part according to an example of the present application.

Further, FIG. 23 shows a schematic exploded perspective view of the second driving part according to an example of the present application. Referring to FIG. 23, in this example, the second movable part includes at least two chip-end carriers stacked from bottom to top (in order to distinguish it from the carrier of the first movable part mentioned above, the carrier of second movable part may be herein referred to as the chip-end carrier, and the carrier of the first movable part is called the camera lens-end carrier). FIG. 23 shows three chip-end carriers, which are respectively a first chip-end carrier 421, a second chip-end carrier 422 and a third chip-end carrier 423. Particularly, the upper surface of the base part substrate 41a or the lower surface of the chip-end carrier located at the bottom of the second movable part 42 has a first guiding groove 431, and the first guiding groove 431 is provided with a first ball 46a and the first ball 46a can roll along the first guiding groove 431, the upper surface of the base part substrate 41a and the chip-end carrier located at the bottom of the second movable part 42 is supported by the first ball 46a. In the second movable part 42, for any two vertically adjacent chip-end carriers, the upper surface of the lower chip-end carrier or the lower surface of the upper chip-end carrier has a second guiding groove 432, the second guiding groove 432 is provided with a second ball 46b and the second ball 46b can roll along the second guiding groove 432, the upper surface of the lower chip-end carrier and the lower surface of the upper chip-end carrier are supported by the second ball 46b. In this example, the photosensitive assembly 20 is mounted on the uppermost chip-end carrier of the second movable part 42; and the guiding direction of the first guiding groove 431 is a translation direction along the x-axis or a translation direction along the y-axis (the guiding direction of the first guiding groove 431 in FIG. 23 is a translation direction along the x-axis), wherein the guiding direction of the second guiding groove 432 of one chip-end carrier is perpendicular to the guiding direction of the first guiding groove 431 (the guiding direction of a second guiding groove 432 in FIG. 23 is a translation direction along the y-axis, which is perpendicular to the guiding direction of the first guiding groove 431).

Figure 24:
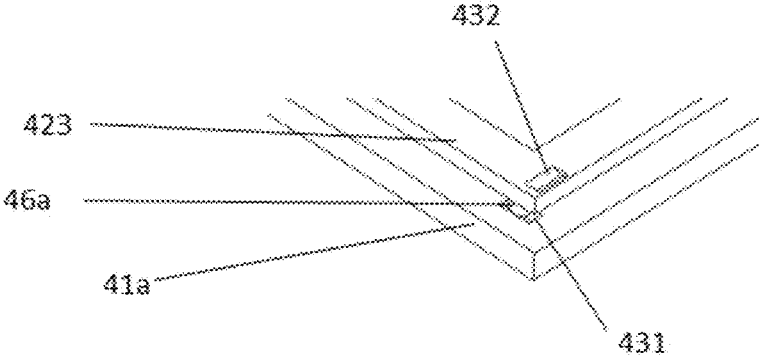
FIG. 24 shows a partially enlarged schematic diagram of a corner region of a third chip-end carrier and a base part substrate according to an example of the present application.
Figure 25:
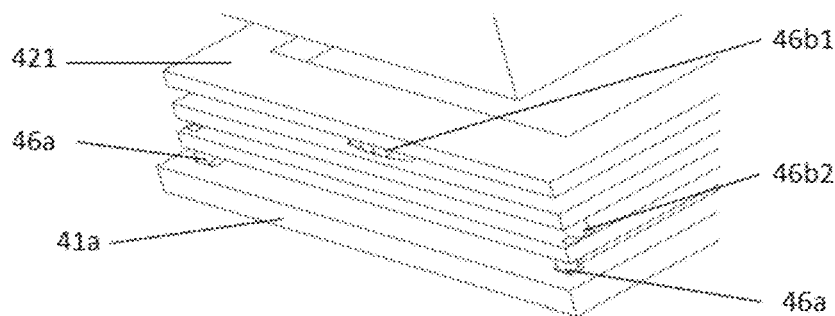
FIG. 25 shows a schematic perspective view of three chip-end carriers and a base part substrate according to an example of the present application.
Figure 26:
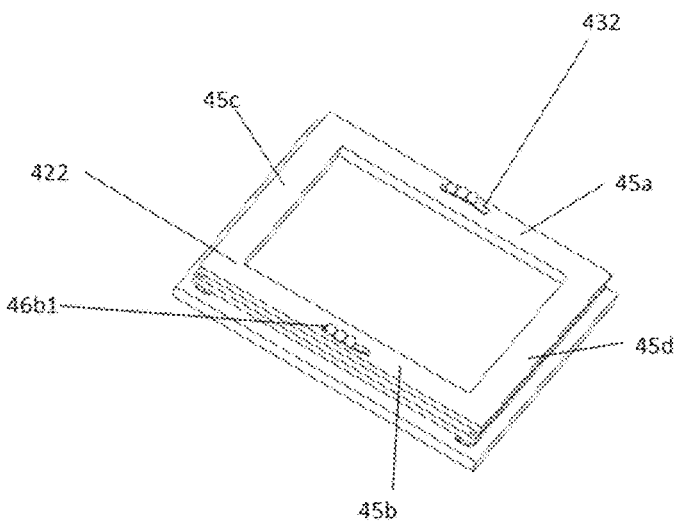
FIG. 26 shows a schematic perspective view of two chip-end carriers and a base part substrate in FIG. 25.

More particularly, still referring to FIG. 23, in this example, the chip-end carrier includes a first chip-end carrier 421, a second chip-end carrier 422 and a third chip-end carrier 423. The first chip-end carrier 421, the second chip-end carrier 422 and the third chip-end carrier 423 are arranged sequentially from top to bottom. The second guiding groove 432 includes an arc-shaped guiding groove and a straight-line guiding groove; the arc-shaped guiding groove is used to guide the second ball 46b to roll along an arc rotating around the z-axis, wherein the z-axis is a coordinate axis having a direction consistent with that of optical axis; the straight-line guiding groove is used to guide the second ball 46b to roll along the x-axis or y-axis. The second guiding groove 432 located on the third chip-end carrier 423 in FIG. 23 is a straight-line guiding groove, and its guiding direction is a translation direction along the y-axis, the guiding direction is perpendicular to the guiding direction (a translation direction along the x-axis) of the first guiding groove 431. Further, FIG. 24 shows a partially enlarged schematic diagram of a corner region of the third chip-end carrier and the base part substrate according to an example of the present application. FIG. 24 shows the first guiding groove 431 and the first ball 46a arranged in the first guiding groove 431, and also shows the second guiding groove 432 as a straight-line guiding groove arranged on the upper surface of the third chip-end carrier 423, and the second ball 46b arranged in the first guiding groove. Further, FIG. 25 shows a schematic perspective view of three chip-end carriers and the base part substrate according to an example of the present application. FIG. 26 shows a schematic perspective view of the two chip-end carriers and the base part substrate in FIG. 25. Referring to FIG. 24, FIG. 25 and FIG. 26, in this example, the second ball 46b includes an upper layer second ball 46b1 and a lower layer second ball 46b2; the upper layer second ball 46b1 is arranged between the lower surface of the first chip-end carrier 421 and the upper surface of the second chip-end carrier 422; the lower layer second ball 46b2 is arranged between the lower surface of the second chip-end carrier 422 and the upper surface of the third chip-end carrier 423. The first ball 46a is arranged between the lower surface of the third chip-end carrier 423 and the upper surface of the base part substrate 41a. The second guiding groove 432 includes two types located in different layers, one is an arc-shaped guiding groove, and the other is a straight-line guiding groove. Particularly, the arc-shaped guiding groove is located on the lower surface of the first chip-end carrier 421 or the upper surface of the second chip-end carrier 422; the straight-line guiding groove is located on the lower surface of the second chip-end carrier 422 or the upper surface of the third chip-end carrier 423.

Further, in one example of the present application, the arc center of the arc-shaped guiding groove is located directly below the photosensitive center, wherein the photosensitive center is the center of the photosensitive region of the photosensitive chip.

It should be noted that in the above examples, although the arc-shaped guiding groove is arranged between the first chip-end carrier and the second chip-end carrier, the present application is not limited thereto. For example, in another example, an arc-shaped guiding groove may also be provided between the base part substrate and the third chip-end carrier. Particularly, the arc-shaped guiding groove may be provided, for example, on the upper surface of the base part substrate, in which a first ball is arranged. In this way, the second movable part can rotate in a direction rotating around the z-axis relative to the base part substrate as a whole.

Figure 27:
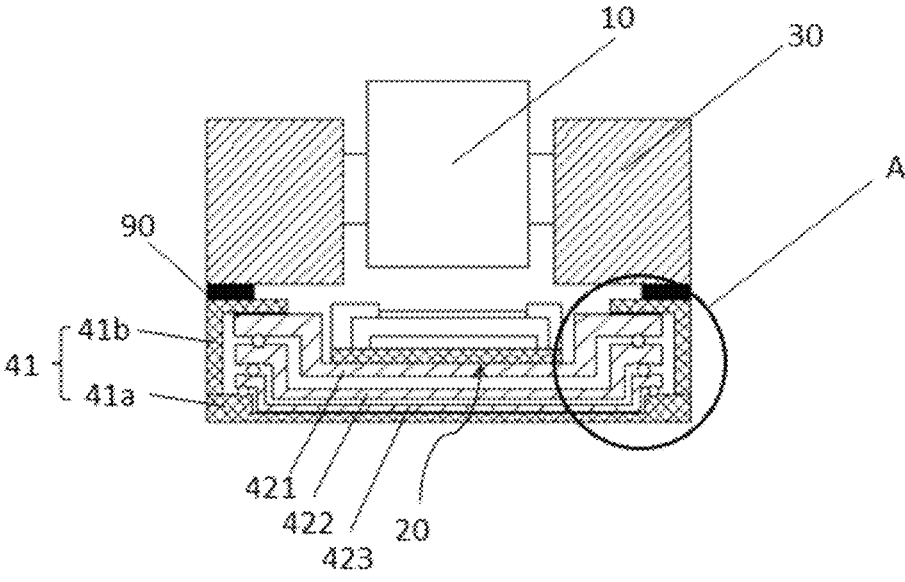
FIG. 27 shows a schematic cross-section view of a camera module according to an example of the present application.
Figure 28:
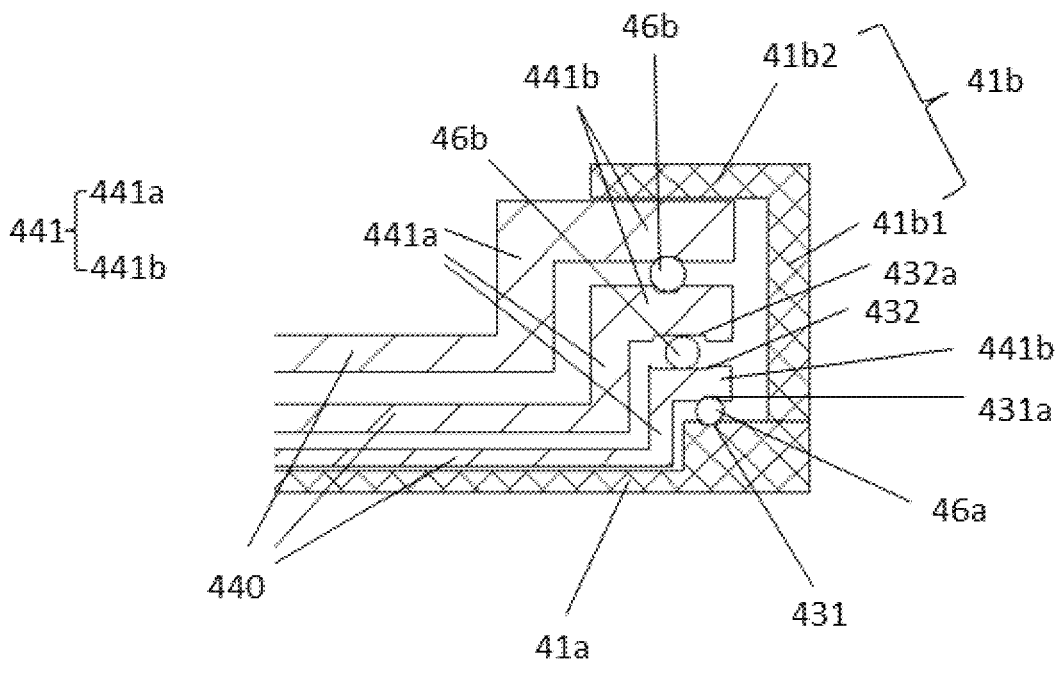
FIG. 28 shows an enlarged schematic view of Region A in FIG. 27.

Further, FIG. 27 shows a schematic cross-section view of a camera module according to an example of the present application, and FIG. 28 shows an enlarged schematic view of Region A in FIG. 27. Referring to FIG. 27 and FIG. 28 together, in this example, each of the chip-end carriers includes a carrier substrate 440 and a carrier wall 441 extending upward from the edge region of the carrier substrate 440, and the carrier wall 441 surrounds around the photosensitive assembly 20. The second guiding groove 432 is located on the upper surface of the carrier wall 441; for any two vertically adjacent chip-end carriers, the lower surface of the carrier wall 441 of the upper chip-end carrier is supported by a second ball 46b. The carrier wall 441 includes a wall body 441a and an extension part 441b formed by extending outward from the top region of the wall body 441a; for any two vertically adjacent chip-end carriers, the second guiding groove 432 is arranged on the upper surface of the extension part 441b of the lower chip-end carrier, and the lower surface of the extension part 441b of the upper chip-end carrier is supported by the second ball 46b. For any two vertically adjacent chip-end carriers, the wall body 441a of the lower chip-end carrier surrounds around the wall body 441a of the upper chip-end carrier; and there is a gap between the wall bodies 441a of the two chip-end carriers. Further, the cover 41b includes a cover side wall 41b1 and a supporting platform 41b2 extending inwardly from the top region of the cover side wall 41b1; the bottom of the cover side wall 41b1 is connected to the base part substrate 41a, the supporting platform 41b2 is located above the first chip-end carrier 421, and there is a gap between the lower surface of the supporting platform 41b2 and the upper surface of the first chip-end carrier 421. In this example, the top surface of the supporting platform 41b2 is bonded to the bottom surface of the first driving part 30 through an adhesive material 90. The adhesive material 90 may be an adhesive used in an active calibration process. In this example, a gap suitable for active calibration may be reserved between the top surface of the supporting platform 41b2 and the bottom surface of the first driving part 30 at the design stage, and then the relative positions of the optical camera lens and the photosensitive chip may be determined through active calibration, finally binding them with an adhesive material 90 to form a complete camera module. It should be noted that, the first base part and the first movable part of the first driving part are not separately shown in FIG. 27. In this example, the bottom surface of the first driving part is usually the bottom surface of the first base part, and the first base part includes a motor housing and a motor foundation, and the bottom surface of the first base part may be the bottom surface of the motor foundation. Active calibration is the process of adjusting the posture (tilt angle) and the position of the optical center of the camera lens and photosensitive chip based on the actual imaging results of the photosensitive chip so as to optimize the imaging quality. The adjustment degrees of freedom of the active calibration include one or more degrees of freedom among the six degrees of freedom involving translation at x-axis, y-axis and z-axis, and rotation around the x-axis, y-axis and z-axis.

Further, in one example of the present application, each of the chip-end carriers includes a ring-shaped carrier wall surrounding around the photosensitive assembly, and the second guiding groove is located on the upper surface of the carrier wall. Particularly, at least one of the chip-end carriers is a frame structure formed solely by the carrier wall (i.e., the chip-end carrier may not be provided with a carrier substrate, thereby forming a hollow frame structure. This design helps to reduce the height of the camera module).

Furthermore, in another example of the present application, in the second movable part, a part of the chip-end carrier is a frame structure formed solely by the carrier wall, and another part of the chip-end carrier includes a carrier substrate and the carrier wall extending upwardly from an edge region of the carrier substrate. In the second movable part, the uppermost chip-end carrier includes the carrier substrate and the carrier wall, and the photosensitive assembly is installed in an accommodation groove formed by the carrier substrate and the carrier wall. The uppermost chip-end carrier has a carrier substrate, and the carrier substrate may bear against the bottom surface of the photosensitive assembly, so as to enhance the reliability and firmness of the bonding between the second movable part and the photosensitive assembly.

Further, with reference to FIG. 27 and FIG. 28, in one example of the present application, the lower surface of the lowermost chip-end carrier of the second movable part or the upper surface of the base part substrate has a first fitting groove, and the first fitting groove 431a fits with the first guiding groove 431 and jointly constitutes a guiding channel for the first ball 46a. Further, in the second movable part, for any two vertically adjacent chip-end carriers, the lower surface of the upper chip-end carrier or the upper surface of the lower chip-end carrier has a second fitting groove 432a, and the second fitting groove 432a fits with the second guiding groove 432 and jointly constitutes a guiding channel for the second ball 46b.

Further, in one example of the present application, in a top view, the shape of the chip-end carrier is rectangular, and the edge region of the chip-end carrier includes: a first side 45a, a second side 45b opposite to the first side 45a, a third side 45c intersecting with the first side 45a, and a fourth side 45d opposite to the third side 45c; the length of the first side 45a and the second side 45b is greater than the length of the third side 45c and the fourth side 45d; in a top view, the arc-shaped guiding groove is arranged on the first side 45a and the second side 45b (referring to FIG. 26). It should be noted that, the arrangement position of the arc-shaped guiding groove in this example is not exclusive; for example in another example, the arc-shaped guiding groove may be arranged at the four corner regions of the chip-end carrier. The four corner regions are four corner regions of the rectangular chip carrier, which will not be described in detail below.

Further, in another example of the present application, in a top view, the straight-line guiding grooves are arranged at the four corner regions of the chip-end carrier; the shape of the second base part is rectangular; the first guide grooves are arranged on the four corner regions of the second base part or the chip-end carrier.

Figure 29:
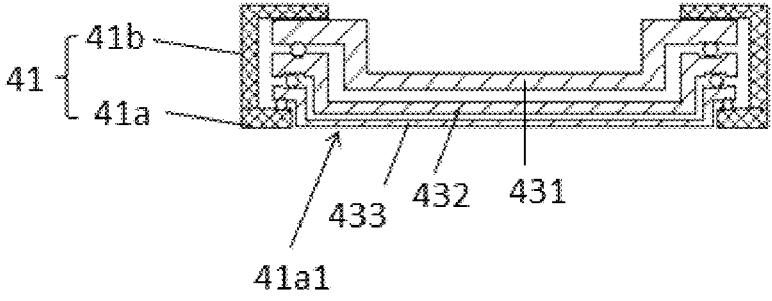
FIG. 29 shows a schematic cross-section view of a second driving part with a through hole in the base part substrate according to an example of the present application.

Further, FIG. 29 shows a schematic cross-section view of the second driving part in which the base part substrate has a through hole according to an example of the present application. Referring to FIG. 29, in this example, the center of the base part substrate 41a of the second base part 41 has a through hole 41a1, and at least a part of the third chip-end carrier 423 (the lowermost chip-end carrier) is located in the through hole 41a1. This design can further reduce the height of the camera module (i.e., the size in the z-axis direction).

Further, FIG. 30a shows the installation position of the driving element of the second driving part in a top view according to an example of the present application. FIG. 30b shows a schematic cross-section view of the second driving part including the driving elements according to an example of the present application. Referring to FIG. 30a and FIG. 30b, in one example of the present application, the driving element of the second driving part 40 is a coil-magnet combination. The magnet 61 may be arranged on the edge region of the second base part 41, and particularly, in this example, the magnet 61 may be arranged on the supporting platform 41b2 of the cover 41b. The coil 62 may be arranged on an edge region of the first chip-end carrier 421. The coil

62 may be soldered to be conductively connected to the circuit board 23 of the photosensitive assembly 20 through the FPC board (flexible board) arranged on the first chip-end carrier 421. Since the first chip-end carrier 421 and the photosensitive assembly 20 move synchronously during the anti-shake process, when the design scheme in which the coil 62 is welded to the circuit board 23 through the FPC board is adopted, it may be ensured that there is no relative movement of the wire or the welding part during the movement, thereby reducing the risk of electrical connection failure or poor contact at the soldering point. In another example, since the relative positions of the first chip-end carrier 421 and the photosensitive assembly 20 are fixed, the coil 62 and the circuit board of the photosensitive assembly 20 may be electrically connected through a land grid array (LGA), thereby avoiding the use of an FPC board (flexible board)) for electrical connection.

Further, referring to FIG. 30*a*, in one example of the present application, preferably, the coil-magnet combination includes three coil-magnet pairs, which are respectively called the first coil-magnet pair 63, the second coil-magnet pair 64, and the third coil-magnet pair 65. Particularly, each coil-magnet pair includes a coil and a magnet. The first coil-magnet pair 63 and the second coil-magnet pair 64 are used to drive the translation of the movable part 42 in the x-axis direction, i.e., to provide a driving force in the x-axis direction. The third coil-magnet pair 65 is used to drive the translation of the movable part 42 in the y-axis direction, i.e., to provide a driving force in the y-axis direction. In a top view (or bottom view), the first coil-magnet pair 63 and the second coil-magnet pair 64 may be respectively arranged along two opposite sides of the second driving part, and these two opposite sides may be referred to as first side 48 and the second side 49, the first side 48 and the second side 49 do not intersect (generally, the first side 48 is parallel to the second side 49). Further, the second coil-magnet pair 64 may be arranged along the third side 47 of the second driving part, and the third side 47 intersects with both the first side 48 and the second side 49 (generally speaking, the third side 47 is perpendicular to the first side 48, also perpendicular to the second side 49). In this example, the three coil-magnet pairs can not only realize x-axis translation and y-axis translation, but also can realize rotation in the xoy plane. For example, when the first coil-magnet pair 63 and the second coil-magnet pair 64 respectively provide driving forces in opposite directions, a combined driving force for rotating a chip-end carrier of the second movable part in the xoy plane may be generated. It should be noted that, the way to provide a driving force for rotation in the xoy plane is not exclusive. For example, the first coil-magnet pair 63 and the third coil-magnet pair 65 can also produce a combined driving force for rotating a chip-end carrier of the second movable part in the xoy plane. Alternatively, the positions of the first coil-magnet pair and the second coil-magnet pair may be staggered (i.e., the positions of the first coil-magnet pair and the second coil-magnet pair may be asymmetrical with respect to the central axis of the second driving part), so that the driving force is provided to realize the rotation in the xoy plane (i.e., the movement in the Rz direction). Particularly, the magnets of the first coil-magnet pair 63 are arranged on the side of the first side 48 close to the third side 47, and the second coil-magnet pair 64 are arranged on a side of the second side 49 close to the fourth side (i.e., the side away from the third side 47), so that the positions of the first coil-magnet pair 63 and the second coil-magnet pair 64 are staggered.

Further, FIG. 31*a* is a schematic diagram of perspective exploded view of the second driving part showing the positions of the coil and the magnet according to an example of the present application. Referring to FIG. 31*a*, in this example, the first coil-magnet pair 63, the second coil-magnet pair 64 and the third coil-magnet pair 65 are respectively located on the first side 48, the second side 49 and the third side 47. Particularly, the first coil-magnet pair 63 is arranged in the middle region of the first side 48, and the second coil-magnet pair 64 is arranged in the middle region of the second side 47, i.e., the first coil-magnet pair 63 and the second coil-magnet pair 64 may be arranged axially symmetrical. The first magnet 63*a* (i.e., the magnet of the first coil-magnet pair), the second magnet 64*a* (i.e., the magnet of the first coil-magnet pair), and the third magnet 65*a* (i.e., the magnet of the third coil-magnet pair) are located at the cover 41*b* of the second base part; the first coil 63*b* (i.e. the coil of the first coil-magnet pair), the second coil 64*b* (i.e. the coil of the second coil-magnet pair) and the third coil 65*b* (i.e. the coil of the third coil-magnet pair) are located on the first chip-end carrier 421. The first coil 63*b*, the second coil 64*b* and the third coil 65*b* may be located directly under the first magnet 63*a*, the second magnet 63*b* and the third magnet 63*c*, respectively.

Further, FIG. 31*b* is a schematic diagram of perspective exploded view of the second driving part showing the positions of the coil and the magnet according to a modified example of the present application. In this example, the positions of the first coil-magnet pair 63 and the second coil-magnet pair 64 are staggered, so as to save effort when driving the photosensitive assembly to rotate in the xoy plane (which in turn helps to increase the anti-shake stroke and improve the anti-shake response speed). Except for this, other contents of this example are completely consistent with the example of FIG. 31*a*, and will not be repeated herein.

FIG. 31*c* is a schematic diagram of perspective exploded view of the second driving part showing the positions of the coil and the magnet according to a modified example of the present application. In this example, the positions of the first coil-magnet pair 63, the second coil-magnet pair 64 and the third coil-magnet pair 65 are consistent with those in the example shown in FIG. 31*b*. The difference of this example is that in this example, only the third magnet 65*a* is located on the cover 41*b* of the second base part, and the first magnet 63*a* and the second magnet 64*a* are both located on the edge region of the base part substrate 41*a*.

FIG. 31*d* is a schematic diagram of perspective exploded view of the second driving part showing the positions of the coil and the magnet according to another modified example of the present application. In this example, the positions of the first coil-magnet pair 63, the second coil-magnet pair 64 and the third coil-magnet pair 65 are consistent with those in the example shown in FIG. 31*b*. The difference of this example is that in this example, only the third magnet 65*a* is located at the edge region of the base part substrate 41*a*, and the first magnet 63*a* and the second magnet 64*a* are both located at the edge region of the third chip-end carrier 623.

In the foregoing several examples, the magnet arrangement schemes of various coil-magnet combinations are given. In general, in some examples of the present application, the magnets in the coil-magnet combinations (i.e., three coil-magnet pairs) may be mounted on the cover, the base part substrate, or the third chip-end carrier; and wherein the magnets of the first coil-magnet pair and the magnets of the second coil-magnet pair are mounted on the same member, so that the first coil-magnet pair and the second coil-magnet pair may be used in better cooperation, so as to provide a combined driving force more accurately. Herein, the member refers to one of the cover, the base part substrate and the third chip-end carrier. Further, in some preferred examples, the magnets in the coil-magnet combinations (i.e., the three coil-magnet pairs) may be mounted on the base part substrate or the third chip-end carrier, i.e., the magnets are avoided being mounted on the cover. This design can prevent the magnet from interfering with the glue distribution on the bonding surface of the second base part and the first base part. Generally speaking, the glue material has a relatively large bonding force with the material for making the second base part, while the glue material has a relatively small bonding force with the magnet. Additionally, the top surface (upper surface) of the cover is often a bonding surface for bonding with the first base part, so if the magnets are avoided being arranged on the cover, it can also be avoided occupying part region of the bonding surface, thereby avoiding decrease of the reliability of the module structure caused by insufficient adhesion.

Further, FIG. 32a shows a schematic diagram of assembling way of the second driving part before being assembled according to an example of the present application. Referring to FIG. 32a, in this example, the second driving part 40 may be assembled by three main components separated from each other, these three components are respectively the base part substrate 41a, the cover 41b and the second movable part 42; they may be assembled in a vertical orientation. For example, the base part substrate 41a with a first ball 46a may be arranged on an assembling platform, and then the second movable part 42 is arranged above the base part substrate 41a, so that it is supported by the first ball 46a in the base part substrate 41a, and finally the cover 41b is moved to the top of the base part substrate 41a and the second movable part 42, and then the cover 41b is moved downward so that the bottom surface of the side wall 41b1 of the cover is close to the top surface of the base part substrate 41a, and then the bottom surface of the side wall 41b1 of the cover is bonded to the top surface of the base part substrate 41a, thereby completing the assembly of the second driving part 40. The base part substrate 41a may be jointly formed by a side wall of the substrate and a base plate. However, it should be noted that, in other examples, the base part substrate 41a may also be in the shape of a flat plate without a side wall of the substrate, and it may also be referred to as a base plate or a bottom plate at this time.

Further, FIG. 32b shows a schematic diagram of assembling way of the second driving part before being assembled according to another example of the present application. Referring to FIG. 32b, in this example, the second driving part 40 may be assembled in a lateral assembly manner. Particularly, three separate main members, i.e., the main body 41' of the base part, the second movable part 42, and the side cover 41b", may be prepared in advance. Particularly, the main body 41' of the base part includes a base part substrate 41a and a cover main body 41b' connected to the base part substrate 41a (in some examples, the base part substrate 41a and the cover main body 41b' may be integrally formed), the cover main body 41b' is a part of the complete cover 41b, and constitutes a complete cover 41b together with the side cover 41b". In this example, for example, the cover main body 41b' can surround around the second movable part 42 (or the photosensitive assembly) on three side surfaces, then leaving a gap on the remaining side surface, and the gap may be used to insert the second movable part 42 (or the combinational body of the second movable part 42 and the photosensitive assembly) into the main body 41' of the base part from this side surface. The side cover 41b" corresponds to the gap. After the combinational body of the second movable part 42 and the photosensitive assembly is inserted through the gap, the side cover 41b" may be approached from the side surface to the base part substrate 41a, and the outer side surface of the base part substrate 41a is bonded to the inner side surface of the side cover 41b" to form a complete second driving part 40. In this way of bonding and fixing from the side, the parallelism between the upper and lower end surfaces of the second base part 41 is only determined by the manufacturing accuracy of the second base part 41 itself, so this way of bonding and fixing from the side can improve the parallelism between the upper and lower end surfaces of the base part 41 and the parallelism between the upper end surface of the second base part 41 and the second movable part 42.

Further, FIG. 33 shows the layout of the camera module and its connection belt according to an example of the present application. Referring to FIG. 33, in this example, the camera module includes a first connection belt 26a and a second connection belt 26b; wherein the first connection belt 26a is arranged on the top region of the first driving part 30 and is electrically connected to the first driving part 30, and the second connection belt 26b is conductively connected to the circuit board 23 of the photosensitive assembly 20. Particularly, the second connection belt 26b may be provided with multiple bends to form a curved overlapped structure, so as to buffer the stress caused by the movement of the photosensitive assembly 20. A connector may be provided at the end of the second connection belt 26b, and the connector may be fixed by pressing and electrically connected to the transfer post, and then connected to the main board (or other components) of the terminal device through the transfer post 26c. Similarly, the end of the first connection belt 26a can also be connected to a connector, which may be fixed by pressing and electrically connected to the transfer post 26c, and then conductively connecting to the main board (or other components) of the terminal device through the transfer post 26c. In the solution of this example, the conduction circuit of the first driving part 30 may be separated from the photosensitive assembly 20, and is not affected by the movement of the photosensitive assembly 20. The second connection belt 26b and the transfer post 26c may be accommodated in the second housing 70, the first connection belt 26a is located outside the second housing 70, and the top of the second housing 70 can have a third through hole 70a, so that the connector of the first connection belt 26a may protrude into and be conductively connected to the second connection belt 26b or the transfer post 26c.

Further, in the series of examples shown in FIGS. 22-33 above, the camera module can use a suspended circuit board. The structure and technical details of the suspended circuit board have been described in detail above in conjunction with FIGS. 20-22, FIG. 23a and FIG. 23b, and will not be repeated herein.

It should be noted that, the suspended circuit board of the present application can also be implemented in another way. The following description will be made in conjunction with FIG. 34a, FIG. 34b, FIG. 35 and FIG. 36.

Figure 35:
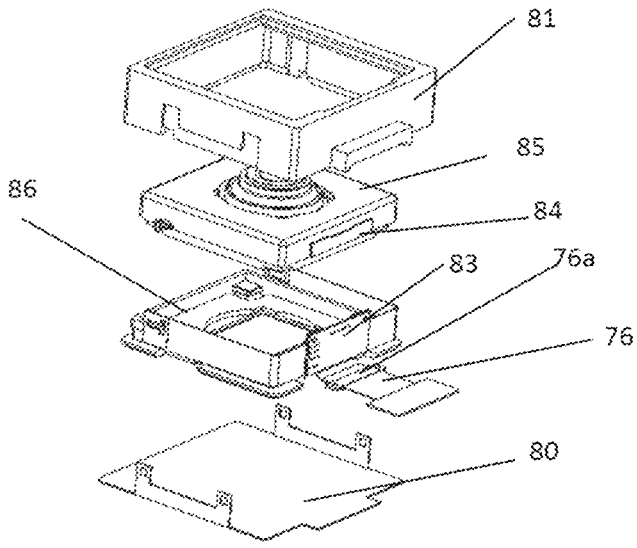
FIG. 35 shows a schematic exploded perspective view of a camera module based on a suspended circuit board according to an example of the present application.
Figure 36:
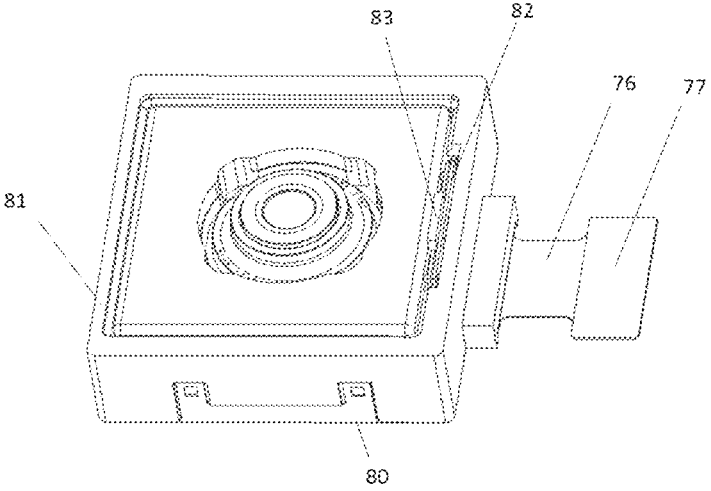
FIG. 36 shows a schematic perspective view of a camera module with a housing based on a suspended circuit board according to an example of the present application.

FIG. 34a shows a schematic front view of a suspended circuit board according to another example of the present application after being expanded, and FIG. 34b shows a schematic rear view of a suspended circuit board according to an example of the present application after being expanded. Referring to FIG. 34a and FIG. 34b, in some examples of the present application, the photosensitive assembly 20 includes a suspended circuit board, and the suspended circuit board includes a rigid circuit board main body 71 and a flexible connection belt 72, and the connection belt 72 is led out from the first side surface 74*a* and the second side surface 74*b* of the circuit board main body 71 and is bent upward to form a bent part; wherein the top of the bent part extends along the periphery of the photosensitive assembly 20 in the horizontal direction, so that the connection belt 72 surrounds around the first side surface 74*a*, the second side surface 74*b* and the third side surface 74*c* of the photosensitive assembly 20, and the connection belts located on the first side surface 74*a* and the second side surface 74*b* respectively has at least one suspension part 75, and the suspension part 75 is fixed to the second base part 41 of the second driving part 40 or fixed to the second base part 41 through an intermediary; wherein the photosensitive assembly 20 has a first side surface 74*a* and a second side surface 74*b* having a position corresponding to that of the circuit board main body 71, the first side surface 74*a* and the second side surface 74*b* are oppositely arranged, and the third side surface 74*c* intersects with both the first side surface 74*a* the second side surface 74*b*. The suspension part 75 has a suspension hole 75*a*, and the second base part 41 or the intermediary has a hook, and the hook hooks the suspension hole 75*a*. Some segments of the connection belt are attached to a rigid substrate for reinforcement to form the suspension part (in a modified example, the suspended circuit board can also be made of a rigid-flex board, wherein the circuit board main body and the suspension part are formed by the hard board part of the rigid-flex board, and the bent part and the connection belt segments connected between the suspension parts are formed by the soft board part of the rigid-flex board). Different from the previous example, in this example, the third side surface 74*c* is not provided with a suspension part, i.e., the suspension part 75 and the suspension hole 75*a* are only provided on the first side surface 74*a* and the second side surface 74*b*. As an alternative, in this example, the connection belt of the third side surface 74*c* is fixed to the second base part 41 by an adhesive material (or fixed to the second base part 41 through an intermediary). Particularly, in this example, the connection belt includes a third connection belt 72*a* and a fourth connection belt 72*b*, wherein the third connection belt 72*a* is led out from the first side surface 74*a* of the circuit board main body 71 and bent upward to form a bent part 73, then extending along the first side surface 74*a* of the photosensitive assembly 20, and bending horizontally at the corner and continuing to extend along the third side surface 74*c*; the fourth connection belt 72*b* is led out from the second side surface 74*b* of the circuit board main body 71 and bent upward to form another bent part, then extending along the second side surface 74*b* of the photosensitive assembly 20, and bending horizontally at the corner and continuing to extend along the third side surface 74*c*; the third connection belt 72*a* and the fourth connection belt 72*b* are joined at the third side surface 74*c* and are conductively connected to each other (they may be fastened to each other through male and female connectors, or the combination and conductive connection may be realized by soldering). Further, FIG. 35 shows a schematic diagram of the perspective exploded view of a camera module based on a suspended circuit board according to an example of the present application. FIG. 36 shows a schematic diagram of the perspective view of a camera module with a housing based on a suspended circuit board according to an example of the present application. Referring to FIG. 34*a*, FIG. 34*b*, FIG. 35 and FIG. 36, in this example, the camera module further include a first connection belt 84 electrically connected to the first driving part, and the first connection belt 84 is led out from the top region of the first driving part and then bent downward to join with and is connectively connect to the third connection belt 72*a* or the fourth connection belt 72*b* at the third side surface 74*c*. The camera module also includes a housing 81 and a module foundation 80, the inner side surface of the housing 81 has an accommodation groove 82 for accommodating a joint part of the third side surface 74*c*; wherein the joint part is a combination part 83 where the first connection belt, the third connection belt 72*a* and the fourth connection belt 72*b* are engaged with each other; adhesive material is poured into the accommodation groove 82 to fix the first connection belt, the third connection belt 72*a* and the fourth connection strap 72*b* to the housing 81. The module foundation 80 and the housing 81 may be fastened together, so that the first optical driving assembly 85 and the second optical driving assembly 86 are packaged inside the foundation 80 and the housing 81 (refer to FIG. 35 and FIG. 36). Further, the connection belt located on the third side surface 74*c* is also connected to a fifth connection belt 76, and the fifth connection belt 76 has a connector 77 for external connection; the suspended circuit board can also have a fixing part 76*a* for fixing the fifth connection belt 76. Particularly, the first optical driving assembly 85 includes a first driving part and an optical camera lens, and the optical camera lens is installed inside the first movable part of the first driving part. The second optical driving component 86 includes a second driving part and a photosensitive assembly, and the photosensitive assembly is fixed to the second movable part of the second driving part.

At the time of assembling, firstly the first driving part and the optical camera lens may be assembled into the first optical driving assembly 85, and the second driving part and the photosensitive assembly may be assembled into the second optical driving assembly 86. Then, the relative positions of the optical camera lens and the photosensitive chip are adjusted through an active calibration process, and the first driving part (a first base part) and the second driving part (a second base part) are bonded by glue. Next, the bonded first optical driving assembly 85 and second optical driving assembly 86 are assembled in the through hole of the module housing 81 from bottom to top, and then the module foundation 80 is attached to the module housing 81; finally glue is poured into the accommodating groove 82 of the housing to fix the first optical driving assembly 85, the second optical driving assembly 86 and the module housing 81 together. At the same time, glue is poured into the accommodating groove 82, and the combination part of the first connection belt 84, the third connection belt 72*a* and the fourth connection belt 72*b* can also be fixed to the module housing 81, the first base part or the second base part.

The above description is only preferred examples of the present application and an illustration of the applied technical principles. Those skilled in the art should understand that the scope of the invention involved in this application is not limited to the technical solutions formed by the specific combinations of the above-mentioned technical features, but should also cover other technical solutions formed by any combinations of the above-mentioned technical features or the equivalent features thereof without departing from the inventive concept. For example, a technical solution formed by replacing the above-mentioned features with technical features with similar functions disclosed in (but not limited to) this application.

The invention claimed is:

1. A drive structure for an optical actuator, characterized by comprising:

a first driving part adapted to mounting a camera lens, wherein the first driving part includes a first base part, a first movable part movably connected to the first base part, and a camera lens driving coil mounted on the first movable part, and a x-axis and a y-axis are coordinate axes perpendicular to the optical axis of the camera lens, and the x-axis and the y-axis are perpendicular to each other; and a second driving part adapted to mounting a photosensitive assembly, wherein the second driving part includes a second base part, a second movable part and a photosensitive assembly driving coil mounted on the second movable part, and the second movable part is located below the second base part and is movably connected to the second base part, and the photosensitive assembly is located below the second movable part and is fixed to the second movable part;

wherein the first driving part and the second driving part have a common magnet, and the common magnet is arranged on the first base part or the second base part, and the photosensitive assembly includes a photosensitive chip;

the first driving part drives the camera lens to translate in x-axis and y-axis directions by means of the electromagnetic induction of the camera lens driving coil and the common magnet, and the second driving part drives the photosensitive chip to translate in the x-axis and y-axis directions by means of the electromagnetic induction of the photosensitive assembly driving coil and the common magnet, and the camera lens and the photosensitive chip are configured to be driven simultaneously and move in opposite directions.

2. The driving structure for optical actuator according to claim 1, wherein a camera lens movement distance b of movement of the camera lens driven by the first driving part, and a photosensitive chip movement distance c of movement of the photosensitive chip driven by the second driving part, are determined by a detected tilt shaking angle a of the camera module, and the camera lens movement distance b, the photosensitive chip movement distance c, and the image focal length f of the camera module satisfy the following equation:

$$a=\arctan(b/f)+\arctan(c/f).$$

3. The driving structure for optical actuator according to claim 2, wherein the driving structure further includes a driving logic module having an anti-shake threshold K, and the driving logic module is used to make a ratio between the camera lens movement distance b and the photosensitive chip movement distance c remain at a preset fixed ratio when the tilt shaking angle a is less than or equal to the anti-shake threshold K, and to make the photosensitive chip movement distance c reach a maximum value $c_{max}$ of movement stroke when the tilt shaking angle a is greater than the anti-shake threshold K, and the camera lens movement distance b is calculated according to the following relationship expression: $b=\tan(a/f)-c_{max}$.

4. The driving structure for optical actuator according to claim 3, wherein the preset fixed ratio between the camera lens movement distance b and the photosensitive chip movement distance c is set on the basis of the weight of the camera lens, the driving force of the first driving part, the weight of the photosensitive chip or photosensitive assembly, and the driving force of the second driving part, so that the times for the camera lens and the photosensitive chip to move to the respective anti-shake target positions are same.

5. The driving structure for optical actuator according to claim 1, wherein the second movable part is movably connected to the second base part through balls, and the degree of freedom for movement of the second movable part relative to the second base part is restricted within the xoy plane by a ball-based suspension system.

6. The driving structure for optical actuator according to claim 5, wherein the driving structure further includes a rear housing located below the second driving part, and the rear housing is connected to the second base part to form an accommodating cavity, and the second movable part and the photosensitive assembly are located in the accommodating cavity, and there is a gap between the photosensitive assembly and the bottom of the rear housing.

7. The driving structure for optical actuator according to claim 5, wherein the second movable part has an extension arm extending downward, and the extension arm is bonded to the circuit board of the photosensitive assembly, and the extension arm is provided with an FPC, and the FPC is directly welded to the circuit board.

8. The driving structure for optical actuator according to claim 5, wherein the second base part includes a base and a cover, and the cover includes a side wall formed by extending downward from the base to surround the second movable part and a supporting platform formed by extending horizontally inward from the side wall.

9. The driving structure for optical actuator according to claim 8, wherein an upper surface of the second base part has a stepped structure, and the stepped structure includes a first step surface at the outside and a second step surface at the inside, and the height of the second step surface is lower than the height of the first step surface.

10. The driving structure for optical actuator according to claim 9, wherein an upper surface of the edge region of the second movable part has a groove, and the balls are placed in the groove.

11. The driving structure for optical actuator according to claim 8, wherein the balls are located between the supporting platform and the second movable part.

12. The driving structure for optical actuator according to claim 8, wherein a layer of balls are provided separately between the base and the second movable part, and between the second movable part and the supporting platform.

13. The driving structure for optical actuator according to claim 12, wherein an inwardly recessed slot is provided on an outer side surface of the second movable part, and the supporting platform is fitted into the slot.

14. The driving structure for optical actuator according to claim 8, wherein glue is arranged between a lower end surface of the second movable part and an upper end surface of the camera lens holder of the photosensitive assembly, and the glue avoids the four corners of the second movable part.

15. The driving structure for optical actuator according to claim 8, wherein the common magnet is arranged on the edge region of the second base part, and the camera lens driving coil is arranged on the edge region of the second movable part.

16. The driving structure for optical actuator according to claim 15, wherein in the second driving part, the combinations of coil and magnet formed by the common magnets and the photosensitive assembly driving coils include: a first coil-magnet pair, a second coil-magnet pair, and a third coil-magnet pair; and the first coil-magnet pair and the second coil-magnet pair are used to provide a driving force in the x-axis direction; the third coil-magnet pair is used to provide a driving force in the y-axis direction; and in a top view, the shape of the second driving part is rectangular, and the first coil-magnet pair and the second coil-magnet pair are respectively arranged along a first side and a second side of the second driving part, and the first side and the second side do not intersect with each other, and the third coil-magnet pair is arranged along a third side of the second driving part, and the third side intersects with both the first side and the second side; and the camera lens driving coils include a first camera lens driving coil, a second camera lens driving coil, and a third camera lens driving coil respectively arranged above the first coil-magnet pair, the second coil-magnet pair, and the third coil-magnet pair; and the common magnet of the first camera lens driving coil and the first coil-magnet pair, and the common magnet of the second camera lens driving coil and the second coil-magnet pair, are used to provide a driving force in the x-axis direction; and the common magnet of the third camera lens driving coil and the third coil-magnet pair is used to provide a driving force in the y-axis direction.

17. The driving structure for optical actuator according to claim 8, wherein the first base part includes a motor foundation located below the first movable part, and the motor foundation has a light through hole, and the common magnet is mounted on an edge region of the motor foundation, and the camera lens driving coil is mounted on the bottom of the first movable part;

the magnet-coil pairs formed by the common magnets and the camera lens driving coils include: a first coil-magnet pair, a second coil-magnet pair, and a third coil-magnet pair; the first coil-magnet pair and the second coil-magnet pair are used to provide a driving force in the x-axis direction; the third coil-magnet pair is used to provide a driving force in the y-axis direction; and in a top view, the outer contour of the first driving part is rectangular, and the first coil-magnet pair and the second coil-magnet pair are respectively arranged along a first side and a second side of the first driving part, and the first side and the second side do not intersect with each other, and the third coil-magnet pair is arranged along a third side of the second driving part, and the third side intersects with both of the first side and the second side; and the photosensitive assembly driving coil includes a first photosensitive assembly driving coil, a second photosensitive assembly driving coil, and a third photosensitive assembly driving coil respectively arranged under the first coil-magnet pair, the second coil-magnet pair, and the third coil-magnet pair; the common magnet of the first photosensitive assembly driving coil and the first coil-magnet pair, and the common magnet of the second photosensitive assembly driving coil and the second coil-magnet pair, are used to provide a driving force in the x-axis direction; and the common magnet of the third photosensitive assembly driving coil and the third coil-magnet pair is used to provide the driving force in the y-axis direction.

18. The driving structure for optical actuator according to claim 17, wherein in a top view, a notch or a through hole is provided at a position on the second base part corresponding to the photosensitive assembly driving coil.

19. The driving structure for optical actuator according to claim 17, wherein the magnet-coil pairs formed by the common magnets and the photosensitive assembly driving coils include: a first coil-magnet pair, a second coil-magnet pair, and a third coil-magnet pair; the first coil-magnet pair and the second coil-magnet pair are used to provide a driving force in the x-axis direction; the third coil-magnet pair is used to provide a driving force in the y-axis direction driving force; and in a top view, the outer contour of the second driving part is rectangular, and the first coil-magnet pair and the second coil-magnet pair are respectively arranged along a first side and a second side of the first driving part, and the first side and the second side do not intersect with each other, and the third coil-magnet pair is arranged along a third side of the second driving part, the third side intersects with both the first side and the second side;

the camera lens driving coils include an x-axis camera lens driving coil and a y-axis camera lens driving coil, the x-axis camera lens driving coil is located directly above the first coil-magnet pair, and the y-axis camera lens driving coil is located directly above the third coil-magnet pair.

20. A camera module, characterized by comprises:

a camera lens;

a photosensitive assembly; and a driving structure for optical actuator according to claim 1;

wherein the camera lens is mounted on the first driving part, and the photosensitive assembly is mounted on the second driving part.

\* \* \* \* \*